US010339127B2

(12) United States Patent
Colrain et al.

(10) Patent No.: US 10,339,127 B2
(45) Date of Patent: Jul. 2, 2019

(54) GUARANTEED COMMIT OUTCOME IN A DISTRIBUTED TRANSACTION PROCESSING SYSTEM

(71) Applicant: ORACLE INTERNATIONAL CORPORATION, Redwood Shores, CA (US)

(72) Inventors: Carol Colrain, Redwood Shores, CA (US); Stefan Heinrich Roesch, Redwood Shores, CA (US); Todd J. Little, Palantine, IL (US); Paul Parkinson, Mount Laurel, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 602 days.

(21) Appl. No.: 15/009,660

(22) Filed: Jan. 28, 2016

(65) Prior Publication Data
US 2017/0220621 A1    Aug. 3, 2017

(51) Int. Cl.
G06F 17/30     (2006.01)
G06F 16/23     (2019.01)
G06F 11/07     (2006.01)

(52) U.S. Cl.
CPC ...... *G06F 16/2365* (2019.01); *G06F 11/0745* (2013.01); *G06F 11/0757* (2013.01);
(Continued)

(58) Field of Classification Search
CPC .............................................. G06F 17/30371
See application file for complete search history.

(56) References Cited

U.S. PATENT DOCUMENTS 5,835,766 A    11/1998    Iba et al.
5,966,706 A    10/1999    Biliris et al.
(Continued)

OTHER PUBLICATIONS

Samaras, George, "Two-Phase Commit Optimizations in a Commerical Distributed Environment", dated 1995, kluwer Academic Publishers, 36 pages.
(Continued)

*Primary Examiner* — Usmaan Saeed
*Assistant Examiner* — David M Nafziger
(74) *Attorney, Agent, or Firm* — Hickman Palermo Becker Bingham LLP

(57) ABSTRACT

Techniques are described for providing a guaranteed commit outcome for global transactions that are optimized by deferring the commit processing to a resource manager, such as a DBMS, using optimizations. The "Distributed Transaction Processing: The XA Specification" standard specification is ambiguous regarding commit outcomes for transactions managed by DBMS, resulting in wrong results for vendors implementing the standard. The techniques described provide a guaranteed commit outcome when using the optimizations, creating the opportunity for safe replay of global transactions when a communication error or timeout occurs between the transaction manager and the resource manager, and eliminating ambiguous transaction outcomes reaching applications and end users.

Techniques described herein distinguished between global transactions in a session managed by a transaction manager, and those in the same session that are managed by the resource manager using the optimizations. The techniques provide a guaranteed commit outcome when the commit is managed by the resource manager, or when a transaction manager is managing the transaction. Switching between the different techniques to provide a guaranteed outcome occurs in a safe, performing, and silent manner, based on who (Continued)

controls the current transaction in a session. The solution includes one-phase processing, read only optimizations, and promotable transactions.

60 Claims, 8 Drawing Sheets

(52) U.S. Cl.
    CPC ...... *G06F 11/0793* (2013.01); *G06F 16/2308* (2019.01); *G06F 16/2379* (2019.01)

(56) References Cited

U.S. PATENT DOCUMENTS

| | | | |
|---|---|---|---|
| 5,983,225 | A | 11/1999 | Anfindsen |
| 6,041,357 | A | 3/2000 | Kunzelman et al. |
| 6,052,695 | A | 4/2000 | Abe et al. |
| 6,182,186 | B1 | 1/2001 | Daynes |
| 6,272,675 | B1 | 8/2001 | Schrab et al. |
| 6,275,843 | B1 | 8/2001 | Chorn |
| 6,442,552 | B1 | 8/2002 | Frolund et al. |
| 6,625,601 | B1 | 9/2003 | Molloy |
| 6,728,747 | B1 | 4/2004 | Jenkins et al. |
| 6,850,938 | B1 | 2/2005 | Sadjadi |
| 6,922,792 | B2 | 7/2005 | Moser |
| 7,082,432 | B2 | 7/2006 | Bhogi et al. |
| 7,228,455 | B2 | 6/2007 | Pavlik et al. |
| 7,290,056 | B1 | 10/2007 | McLaughlin |
| 7,415,470 | B2 | 8/2008 | Kasamsetty et al. |
| 7,502,824 | B2 | 3/2009 | Kaluskar et al. |
| 7,536,462 | B2 | 5/2009 | Pandya |
| 7,539,746 | B2 | 5/2009 | Bankier et al. |
| 7,552,122 | B1 | 6/2009 | Georgiev |
| 7,552,218 | B2 | 6/2009 | Kaluskar et al. |
| 7,558,883 | B1 * | 7/2009 | Lamport ............... G06F 11/142 709/201 |
| 7,631,107 | B2 | 12/2009 | Pandya |
| 7,634,512 | B2 | 12/2009 | Cao et al. |
| 7,747,754 | B2 | 6/2010 | Kalaukar et al. |
| 7,761,435 | B2 | 7/2010 | Stanev et al. |
| 7,849,173 | B1 | 12/2010 | Uhlik |
| 7,849,177 | B2 | 12/2010 | Uhlik |
| 7,853,698 | B2 | 12/2010 | Stanev et al. |
| 7,890,457 | B2 | 2/2011 | Dias et al. |
| 7,890,458 | B2 | 2/2011 | Dias et al. |
| 8,005,966 | B2 | 8/2011 | Pandya |
| 8,024,299 | B2 | 9/2011 | Dias et al. |
| 8,176,022 | B1 | 5/2012 | Garcia |
| 8,984,170 | B2 | 3/2015 | Colrain et al. |
| 9,323,922 | B2 | 4/2016 | Muralidharan |
| 2002/0087366 | A1 | 7/2002 | Collier et al. |
| 2003/0028654 | A1 | 2/2003 | Abjanic et al. |
| 2003/0105768 | A1 | 6/2003 | Berkowitz et al. |
| 2003/0131045 | A1 | 7/2003 | McGee et al. |
| 2003/0204769 | A1 | 10/2003 | Coughlin |
| 2004/0015600 | A1 | 1/2004 | Tiwary et al. |
| 2004/0068501 | A1 | 4/2004 | McGoveran |
| 2004/0215772 | A1 | 10/2004 | Dinker et al. |
| 2004/0216109 | A1 | 10/2004 | Bhogi et al. |
| 2004/0225915 | A1 | 11/2004 | Johnson |
| 2005/0015353 | A1 | 1/2005 | Kumar |
| 2005/0021514 | A1 | 1/2005 | Barga et al. |
| 2005/0038848 | A1 | 2/2005 | Kaluskar et al. |
| 2005/0125445 | A1 | 6/2005 | Cotner |
| 2005/0131879 | A1 | 6/2005 | Ghosh et al. |
| 2005/0186975 | A1 | 8/2005 | Yach et al. |
| 2005/0187891 | A1 | 8/2005 | Johnson et al. |
| 2005/0228834 | A1 | 10/2005 | Shinkai |
| 2005/0262077 | A1 | 11/2005 | Barnes et al. |
| 2006/0036463 | A1 | 2/2006 | Patrick |
| 2006/0036617 | A1 | 2/2006 | Bastawala et al. |
| 2006/0190504 | A1 | 8/2006 | Pruet |
| 2006/0282422 | A1 | 12/2006 | Al-Omari |
| 2007/0067266 | A1 | 3/2007 | Lomet |
| 2007/0168351 | A1 | 7/2007 | Fachan |
| 2007/0226218 | A1 | 9/2007 | Chatterjee et al. |
| 2007/0261054 | A1 | 11/2007 | Chesebro et al. |
| 2008/0010240 | A1 | 1/2008 | Zait |
| 2008/0097960 | A1 | 4/2008 | Dias et al. |
| 2008/0097961 | A1 | 4/2008 | Dias et al. |
| 2008/0097995 | A1 | 4/2008 | Dias et al. |
| 2008/0097996 | A1 | 4/2008 | Dies et al. |
| 2008/0098003 | A1 | 4/2008 | Dias et al. |
| 2008/0098048 | A1 | 4/2008 | Cao et al. |
| 2008/0134219 | A1 | 6/2008 | Dorrance et al. |
| 2008/0228834 | A1 | 9/2008 | Burchall et al. |
| 2009/0077135 | A1 | 3/2009 | Yalamanchi et al. |
| 2009/0182787 | A1 | 7/2009 | Parkinson |
| 2009/0327468 | A1 | 12/2009 | Hirsch |
| 2010/0005097 | A1 | 1/2010 | Liang et al. |
| 2010/0030818 | A1 | 2/2010 | Cooper et al. |
| 2010/0042601 | A1 | 2/2010 | Kelley et al. |
| 2010/0063982 | A1 | 3/2010 | Lawrence |
| 2010/0293137 | A1 | 11/2010 | Zuckerman et al. |
| 2010/0318394 | A1 | 12/2010 | Nayak et al. |
| 2011/0212783 | A1 | 9/2011 | Dale et al. |
| 2011/0218981 | A1 | 9/2011 | Retnakumari et al. |
| 2011/0258630 | A1 | 10/2011 | Fee |
| 2011/0276550 | A1 | 11/2011 | Colle et al. |
| 2012/0179645 | A1 | 7/2012 | Lomet et al. |
| 2013/0066837 | A1 | 3/2013 | Colrain |
| 2013/0066948 | A1 | 3/2013 | Colrain |
| 2013/0066949 | A1 | 3/2013 | Colrain |
| 2013/0066952 | A1 | 3/2013 | Colrain |
| 2013/0066955 | A1 * | 3/2013 | Neel ...................... H04L 67/146 709/203 |
| 2013/0297566 | A1 | 11/2013 | Colrain |
| 2013/0304714 | A1 | 11/2013 | Lee et al. |
| 2014/0095547 | A1 | 4/2014 | Guo et al. |
| 2014/0157276 | A1 | 6/2014 | Smithson |
| 2014/0229531 | A1 | 8/2014 | Neel et al. |
| 2015/0120531 | A1 | 4/2015 | Stridh |
| 2015/0172390 | A1 | 6/2015 | Colrain et al. |
| 2015/0309884 | A1 | 10/2015 | Sampbell et al. |
| 2015/0309889 | A1 * | 10/2015 | Campbell ............ G06F 11/1469 714/16 |
| 2015/0326673 | A1 | 11/2015 | Neel et al. |
| 2016/0124993 | A1 * | 5/2016 | Watson ............. G06F 17/30286 707/690 |
| 2016/0210322 | A1 * | 7/2016 | Little ................ G06F 17/30362 |
| 2016/0321304 | A9 | 11/2016 | Colrain et al. |
| 2017/0177617 | A1 * | 6/2017 | Johnson ............ G06F 17/30194 |

OTHER PUBLICATIONS

Galanis et al., "Oracle Database Replay," ACM, 2008, pp. 1159-1170 (12 pages).

Colle et al., "Oracle Database Replay," ACM, 2009 (4 pages).

"Database Replay", Oracle White Paper, 2007 (19 pages).

"28 Transparent Application Failover", Oracle® Database JDBC Developer's Guide and Reference 10g Release 2 (10.2) Part No. B14355-04 from the Internet on Jul. 25, 2011, dated 1999 (3 pages).

U.S. Appl. No. 13/448,258, filed Apr. 16, 2012, Notice of Allowance, dated Oct. 30, 2014.

U.S. Appl. No. 11/729,473, filed Mar. 28, 2007, Decision on Appeal, mailed Jan. 2, 2015.

U.S. Appl. No. 11/729,473, filed Mar. 28, 2007, Final Office Action, dated Feb. 3, 2016.

U.S. Appl. No. 11/729,473, filed Mar. 28, 2007, Interview Summary, dated Jun. 15, 2015.

U.S. Appl. No. 11/729,473, filed Mar. 28, 2007, Interview Summary, dated Dec. 15, 2015.

U.S. Appl. No. 11/729,473, filed Mar. 28, 2007, Notice of Appeal, mailed Oct. 14, 2014.

U.S. Appl. No. 11/729,473, filed Mar. 28, 2007, Office Action, dated Sep. 17, 2015.

U.S. Appl. No. 11/729,473, filed Mar. 28, 2007, Final Office Action, dated Sep. 1, 2009.

U.S. Appl. No. 11/729,473, filed Mar. 28, 2007, Office Action, dated Apr. 29, 2009.

(56) References Cited

OTHER PUBLICATIONS

U.S. Appl. No. 11/729,473, filed Mar. 28, 2007, Office Action, dated Aug. 13, 2010.
U.S. Appl. No. 12/562,984, filed Sep. 18, 2009, Notice of Allowace, dated Apr. 15, 2014.
U.S. Appl. No. 13/229,641, filed Sep. 9, 2011, Notice of Allowance, dated May 6, 2013.
U.S. Appl. No. 13/229,641, filed Sep. 9, 2011, Office Action, dated Nov. 26, 2012.
U.S. Appl. No. 11/729,473, filed Mar. 28, 2007, Advisory Action, dated Oct. 18, 2011.
U.S. Appl. No. 13/448,258, filed Apr. 16, 2012, Office Action, dated May 27, 2014.
U.S. Appl. No. 13/542,278, filed Jul. 5, 2012, Examiner's Answer, dated Jan. 29, 2014.
U.S. Appl. No. 13/448,267, filed Apr. 16, 2013, Office Action, dated Jul. 23, 2013.
U.S. Appl. No. 13/448,267, filed Apr. 16, 2012, Office Action, dated Jan. 24, 2014.
U.S. Appl. No. 13/448,267, filed Apr. 16, 2012, Notice of Allowance, dated Aug. 14, 2014.
U.S. Appl. No. 13/542,278, filed Jul. 5, 2012, Office Action, dated Nov. 23, 2012.
U.S. Appl. No. 13/563,680, filed Jul. 31, 2012, Notice of Allowance, dated Dec. 23, 2013.
U.S. Appl. No. 13/936,061, filed Jul. 5, 2013, Office Action, dated Mar. 25, 2014.
U.S. Appl. No. 13/936,061, filed Jul. 5, 2013, Advisory Action, dated Sep. 4, 2015.
U.S. Appl. No. 13/936,061, filed Jul. 5, 2013, Final Office Action, dated May 28, 2015.
U.S. Appl. No. 13/936,061, filed Jul. 5, 2013, Final Office Action, dated Aug. 8, 2014.
U.S. Appl. No. 13/936,061, filed Jul. 5, 2013, Office Action, dated Dec. 12, 2014.
U.S. Appl. No. 14/231,347, filed Mar. 31, 2014, Notice of Allowance, dated Mar. 17, 2015.
U.S. Appl. No. 14/231,347, filed Mar. 31, 2014, Office Action, dated Nov. 19, 2014.
U.S. Appl. No. 13/542,278, filed Jul. 5, 2012, Final Office Action, dated May 2, 2013.
U.S. Appl. No. 13/448,258, filed Apr. 16, 2012, Office Action, dated Nov. 27, 2013.
U.S. Appl. No. 14/748,451, filed Jun. 24, 2015, Office Action, dated May 16, 2016.
U.S. Appl. No. 13/542,278, filed Jul. 5, 2012, Notice of Allowance, dated Jun. 15, 2016.
U.S. Appl. No. 11/4729,473, filed Mar. 28, 2007, Advisory Action, dated Apr. 18, 2016.
U.S. Appl. No. 14/748,451, filed Jun. 24, 2015, Notice of Allowance, dated Nov. 1, 2016.
Colrain, U.S. Appl. No. 14/587,570, filed Dec. 31, 2014, Interview Summary, dated Jan. 12, 2018.
Colrain, U.S. Appl. No. 14/587,570, filed Dec. 31, 2014, Advisory Action, dated Feb. 2, 2018.
U.S. Appl. No. 14/587,570, filed Dec. 31, 2014, Office Action, dated Mar. 13, 2017.
Hu, U.S. Appl. No. 11/729,473, filed Mar. 28, 2007, Interview Summary, dated Mar. 14, 2017.
Hu, U.S. Appl. No. 11/729,473, filed Mar. 28, 2007, Final Office Action, dated Apr. 27, 2017.
Colrain, U.S. Appl. No. 14/587,570, filed Dec. 31, 2014, Final Office Action, dated Oct. 19, 2017.
Colrain, U.S. Appl. No. 13/936,061, filed Jul. 5, 2013, Notice of Allowance, dated May 17, 2017.
Hu, U.S. Appl. No. 11/729,473, filed Mar. 28, 2007, Office Action, dated Dec. 16, 2016.
Colrain, U.S. Appl. No. 14/587,570, filed Dec. 31, 2014, Office Action, dated Jun. 14, 2018.
Colrain, U.S. Appl. No. 14/587,570, Filed Dec. 31, 2014, Notice of Allowance dated Oct. 31, 2018.

* cited by examiner

GUARANTEED COMMIT OUTCOME IN A DISTRIBUTED TRANSACTION PROCESSING SYSTEM

FIELD OF THE INVENTION

The present invention relates to the field of electronic database management.

BACKGROUND

A client application may receive an error (such as a timeout error) from a resource manager in response to issuing a request to commit a set of commands. Generally, a client application interacts with a server through a session. If access to the session with the server is lost, the application would only be able to generate an error message indicating the communication has failed. The application would be unable to inform its users, which may include other applications, whether the server had executed any of the requested commands, and, if so, whether the execution resulted in any data modifications, or even more, whether the server is continuing to execute the requested commands disconnected from the client application.

Without determining the outcome of the commands in a guaranteed and scalable manner, following an error (such as a loss of communication or timeout or any other error), the application is left not knowing what happened to the execution of the requested commands. The application or user may attempt to retry commands, which could cause logical corruption by submitting a duplicate execution request.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings of certain embodiments in which like reference numerals refer to corresponding parts throughout the figures.

DETAILED DESCRIPTION

Figure 1A:
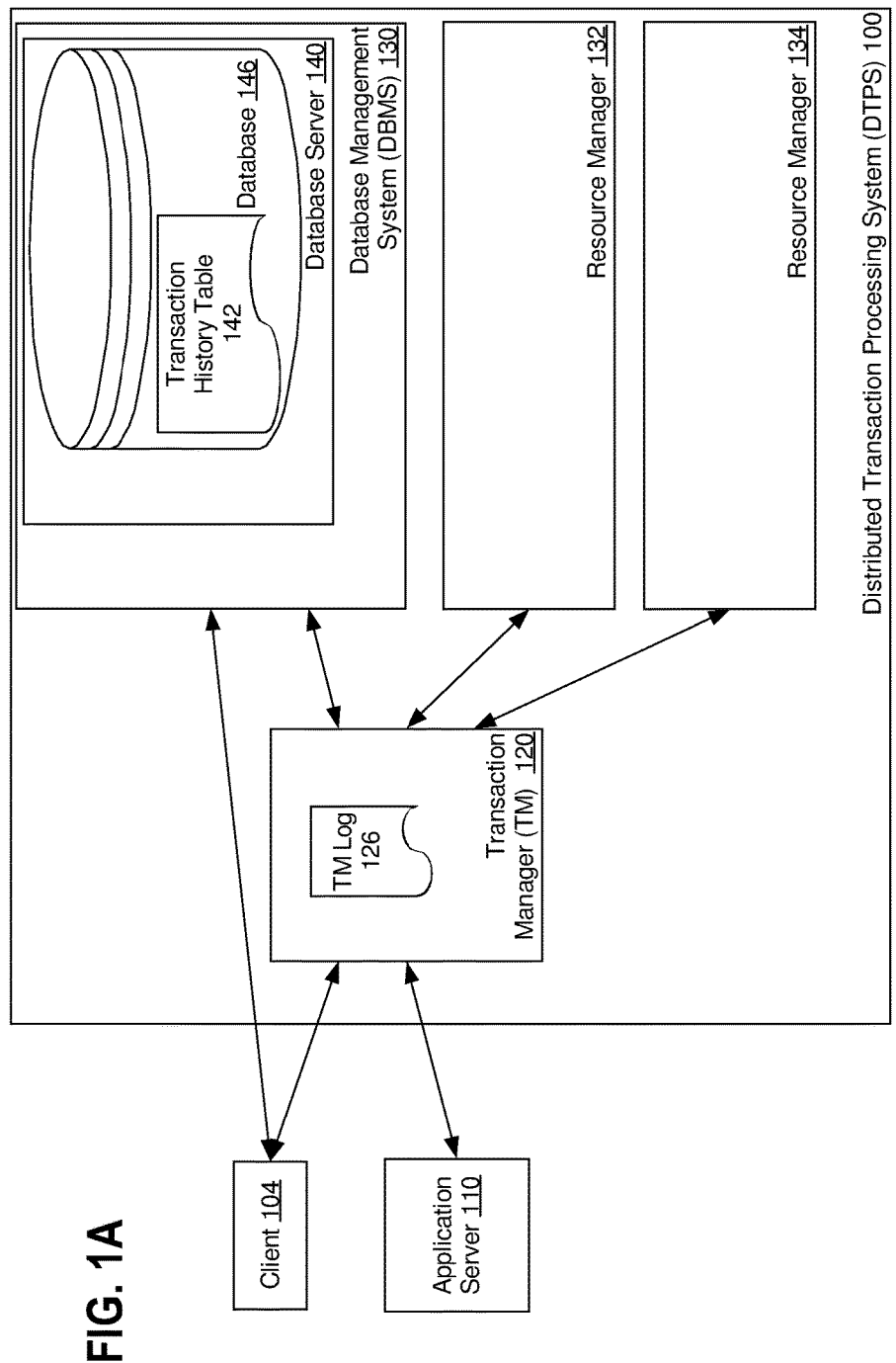
FIG. 1A is a block diagram that illustrates a distributed transaction processing system (DTPS), in an embodiment.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

The approach describes determining an outcome for global transactions, particularly, when a transaction manager (TM) managing a global transaction uses an optimization for the global transaction. A "transaction," as referred to herein, is an atomic unit of work that is committed (i.e. made permanent) or rolled back. A transaction may comprise many computational tasks, which may include user interface, data retrieval, and communications. A transaction may be local and/or global. A "global transaction" refers to a unit of work performed any number of RMs ("resource manager") in a distributed transaction processing system (DTPS) that needs to be committed atomically. A "local transaction" refers to a unit of work to be performed on a single RM, which may include a set of commands sent for execution in a local session with the RM, such that the commands, when/if executed in the local session, would cause one or more transactions against the RM in the local session. The execution of the set of commands in the local session may contribute to a global transaction in progress. A resource manager (RM), as referred to herein, is a system that manages a shared computing resource and provides access to the shared resource to a connecting client application, such as a TM, through a service running on the system.

In some embodiments, when optimizations are used, a transaction manager may have limited ability to determine whether a command, such as a commit command for a global transaction, has been executed, when an error, such as communication error or timeout error, has occurred. For example, a one-phase commit operation does not need prepare phase, at which the TM may roll-back the operation if a communication error or timeout communication error or timeout or timeout occurs. Similarly, a promotable global transaction operation also lacks a prepare phase until the transaction of the operation is promoted to a global transaction. Therefore, the one-phase commit operation as well as promotable global operation present a particular challenge with ambiguous errors, such as a communication error or timeout error, that may lead to user frustration, customer support calls, and lost opportunities.

Optimized global transactions (referred herein also as "optimizations") are those that avoid the overhead of global transaction management by deferring the control of the transactions to a RM, such as a database management system (DBMS). Examples of optimized global transactions are single phase, read-only, last resource optimization, and promotable global transactions. Existing global transaction protocols, such as the XA protocol described in "Distributed Transaction Processing: The XA Specification," are ambiguous regarding determining a commit outcome for a global transactions when using a local commit optimization with a RM. From a client application perspective, the transaction is committed when an RM message denoting the completion of a transaction (local or global) (referred herein as "Commit Outcome"), which is generated after the transaction redo is persistently written, is received by the client application. Although, the commit outcome is deterministic at the RM that completed the transaction, the message for the commit outcome is not durable. During normal processing when a transaction is successfully committed at the RM, a commit message is returned to a client application confirming the commit. Conversely, if the transaction is rolled back by the RM, then the commit outcome message returned to the client denotes a roll back of the transaction. However, when an error occurs during the delivery of the commit outcome message, such as a system, network, or storage outage, the client application receives an error message and is unaware whether the transaction committed or not. Many client applications wrongfully assume that the receipt of an error denotes a failed transaction at the RM, and repeat the commands in the transaction leading to duplicate submissions. Furthermore, the ambiguity in a commit outcome may result in reporting a wrong commit outcome for systems implementing the specification. The techniques described herein resolve ambiguous commit outcomes when using global transactions and optimizations thereof, and also allow for safe replay of such transactions. FIG. 1B that is described below, further illustrates an ambiguous commit outcome, in an embodiment.

In an embodiment, techniques distinguish between global transactions in a session managed by a transaction manager, and local transactions in the same session that are managed by a resource manager, such as a DBMS. The techniques provide a determination for an outcome of commands when the commands are managed by the DBMS. This local management control is invalidated when a transaction manager, instead of the DBMS, is coordinating the transaction. Switching the control and management of transaction between the DBMS and the TM allows for determination of an outcome of command execution after a communication error or timeout occurs.

Distributed Transaction Processing System

Figure 1B:
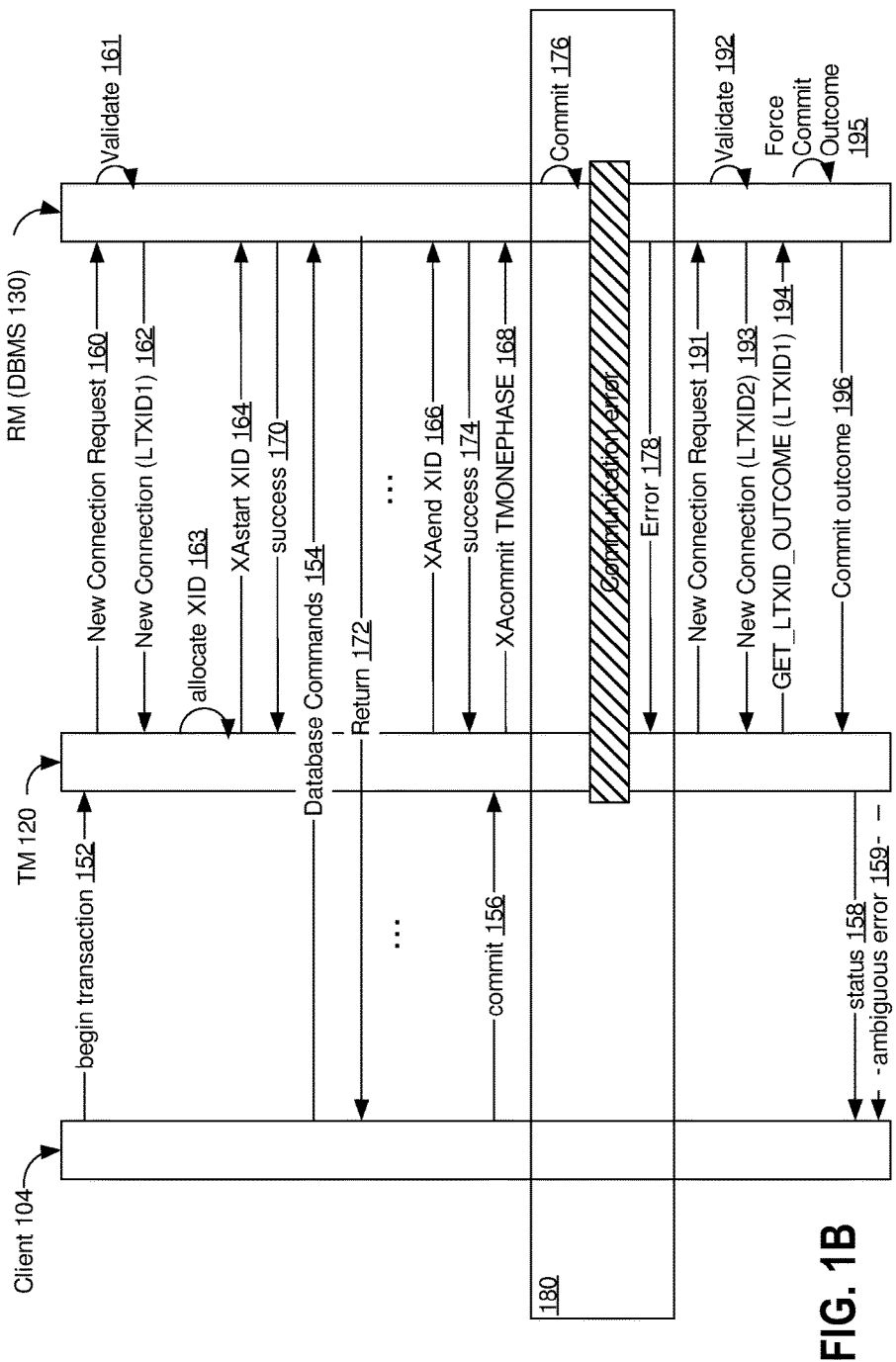
FIG. 1B illustrates example steps for processing a global distributed transaction in a DTPS, in an embodiment.

FIG. 1A depicts a distributed transaction processing system (DTPS) 100 in an operating environment, in an embodiment. DTPS 100 may comprise transaction manager (TM) 120 and numerous resource managers (RMs) connected to TM 120. As one example, a RM may be a database management system (DBMS) 130 that comprises database server 140 hosting database 146. Database 146 may be coupled with a transaction history table 142 that keeps track of all the transactions that occur on database 146. Further description of a DBMS is provided in "Database Management Server" section below.

DTPS 100 may comprise other types of RMs, in an embodiment. Another example of a RM, RM 132, may be a SOAP based web service servicing data requests while RM 134 may be a data access point based on a proprietary protocol. To manage transactions with these different types of RMs, TM 120 may utilize a special protocol that manages distributed transactions with RMs. In an embodiment, such protocol is the XA protocol defined by Open Group© and described in "Distributed Transaction Processing: The XA Specification", the contents of which are hereby incorporated by reference.

Clients of DTPS 100 may issue various data requests to TM 120, which TM 120 may translate into global transactions to RMs, in an embodiment. Client 104 or Application Server 110 may issue data manipulation requests that may require atomic execution by multiple RMs. In response to the request, TM 120 may issue a global transaction to one or more RMs such as DBMS 130, RM 132 and RM 134 to execute the client's data requests. TM 120 may include one or more data structures stored in memory, depicted here as TM log 126, to store various transaction data to be used in the control and recovery of the global transaction by the TM.

Client interactions with DTPS 100 may be illustrated by an example, in which application server 110 hosts a flight reservation web application, DBMS 130 manages flight reservation database and RM 132 handles verification and processing of payments. A user of the web application may book a flight by selecting a flight and entering payment information on the web application. Upon the processing of the user submitted information, application server 110 may request TM 120 to atomically perform data manipulation operations to reserve the flight for a user on DBMS 130 and process the payment with RM 132. To ensure atomicity of this request, TM 120 may issue a global transaction using the XA protocol to RM 132 and DBMS 130 that manages database 146.

In another example, a user at kiosk client 104 may be checking into the flight. Since such request does not require payment information and thus, any transaction with RM 132, client 104 may directly establish a session with DBMS 130 and request the data manipulation operation using one or more SQL statements. No matter whether a single RM or multiple RM are used, the transactions may require atomicity. For example, if as part of the checking in, the user is also selecting a number of bags to be checked in, then the data manipulations for a general flight check-in and the data manipulations for the number of bags may require atomic execution of the request. Thus, client 104 may establish a session with DBMS 130, bypassing TM 120, and issue the data manipulation commands over a local transaction to ensure atomicity in the execution.

Alternatively, client 104 may still utilize TM 120 to complete the same data request. TM 120 may utilize global transaction with a single source of DBMS 130 for performing the request. Using TM 120 may allow client 104 to offer options to the user that include payment operation with utilization of RM 132. For example, the user may be offered to upgrade to the first class or change her flight, transactions that may involve additional payments by the user. Additionally, using TM 120 for a single resource global transactions simplifies the web application logic for requesting data manipulation because the same type of requests may be sent to TM 120 to execute a single RM transaction versus multiple RM transactions.

Functional Overview of Distributed Transaction Processing System

FIG. 1B illustrates example steps for processing global distributed transaction in a distributed transaction processing system, in an embodiment. Client 104 initiates a global transaction by requesting to begin a transaction with TM 120 in step 152. In step 160, TM 120 requests a new connection with an RM for which the transaction has been initiated by client 104. In response to the request in step 161, the RM, such as DBMS 130, authenticates the request and, if successful, in step 162 returns to TM 120 a connection with a valid transaction control (LTXID), as described in more detail in the later sections of this specification. A successful authentication of the connection with the RM establishes a session between the TM and the RM. Accordingly, term "session" is interchangeably used to refer to the authenticated connection with an RM.

TM 120 allocates an XID for the global transaction in step 163. In step 164, TM 120 uses the allocated XID to start the global transaction with an RM, such as DBMS 130. DBMS 130 returns success once the global transaction is initiated on DBMS 130 in step 170. In an embodiment, as an atomic part of global transaction initiation, the local transaction controls are invalidated using techniques described in the later sections of this specification.

Through TM 120, client 104 issues transactional sets of commands, as described below, to be executed on DMBS 130 in step 154. In turn, DBMS 130 returns the statuses of execution in step 172. TM 120 may then end global transaction in step 166 using the allocated XID. Upon successfully ending the transaction, DBMS 130 returns success in step 174. In an embodiment, as an atomic part of ending the global transaction, the local transaction controls are validated using techniques described in the later sections of this specification and returned to the TM as part of the success message in step 174.

Upon completing the transactional sets of database commands, Client 104 request TM 120 to commit the changes produced by the transaction set of commands in step 156. Based on the optimizations described below, TM 120 may determine not to issue any prepare command for the global transaction but rather issue a one phase commit request in step 168.

After a commit request is sent by TM 120, a communication error or timeout may occur that may prevent TM 120 from ascertaining the outcome of the commit request. "Communication error or timeout" (or simply "error") is defined herein as any failure that prevents a RM client from communicating with a RM and thus causing lack of state information about the RM at the RM client. Communication error or timeout may be caused by a failure within the RM or RM client or a failure in the network connecting the RM client with the RM.

Examples 180 illustrates such a communication error or timeout between TM 120 and DBMS 130 after a commit request in step 168. TM 120 receives an error in step 178 without any information whether the commit request at step 168 has been successfully executed by DBMS 130. In fact, the commit may have been successfully executed in step 176. However, if TM 120 were to report to client 104 an ambiguous error in step 159, the client 104 could re-issue the whole transaction to TM 120, which would lead to an undesirable state, where the same changes would be applied twice on DBMS 130. On the other hand, if the commit in step 176 did not occur but client 104 assumed the commit was successful despite receiving the error, then client 104 would erroneously report to the users that the transaction has committed when in fact, the transaction was not committed.

An alternative, as described in more detail in the later sections of this specification, DBMS 130 may resolve the commit outcome and report the accurate commit outcome. In an embodiment, as an atomic part of the commit in step 176, local transaction controls are checked and remain valid. In step 191, TM 120 requests a new connection and, in step 193, receives in response the requested connection with a new local transaction control after the request is successfully validated by DBMS 130 in step 192. In step 194, using this new connection, TM 120 requests the commit outcome for the local transaction control used for requesting the commit in step 168. In response, DBMS 130 forces the commit outcome using the techniques described below in step 195, and DBMS 130 returns the commit outcome to TM 120 in step 196. Upon the receipt of the commit outcome by TM 120, TM 120 reports the status of the global transaction to client 104 in step 158. Based on the accurate outcome information, client 104 has the ability to accurately respond to the communication error or timeout and take remedial actions.

Managing Local Transaction on DBMS

According to one embodiment, transactional set of commands for a local transaction of a client with a DBMS may be managed by the DBMS to ensure the idempotence of the transaction. A "client" with respect to a DBMS may also include a transaction manager (TM) of a global transaction. Local transaction management by a DBMS is described in "Idempotence for Database Systems", U.S. Pat. No. 8,984, 170, filed on Apr. 16, 2012, and "Masking Server Outages from Clients and Applications," U.S. Pat. No. 8,725,882, filed on Jul. 31, 2012, the entire contents of which are hereby incorporated by reference.

In an embodiment, when a session is created for a client connecting to a DBMS, a new logical transaction handle is also created. The logical transaction handle is allocated for every database session and exists on the DBMS with a copy held at the client. The logical transaction handle uniquely defines a transactional set of commands and is used to determine whether a last transactional command committed or not, and if the last transaction command did commit whether that commit was complete or not. The logical transaction handle is the foundation of the idempotence semantics for the DBMS.

In an embodiment, when a communication error with a DBMS occurs, a logical transaction handle may be used to determine a commit outcome of a transaction set of commands. Since the logical transaction handle is available in advance of the next transaction in effect on that session, the client knows the logical transaction handle to use to determine the commit outcome, in the event that the transaction is managed by the DBMS rather than a TM. Although, in some embodiments, global transactions are managed by the TM and the TM determines the outcome, with the use of performance optimizations, the DBMS determines the outcome. In the absence of the logical transaction handle the TM no longer knows the outcome when a communication error or timeout occurs in the commit phase.

An example of a logical transaction handle is a logical transaction identifier ("LTXID"). The LTXID is a globally unique identifier that uniquely defines a specific database local transaction from a client perspective. LTXID for the local transaction may be created within a session and held in user session structure in memory and may then be returned by the DBMS to the client, in an embodiment. The LTXID is returned to the client when the session is authenticated and before a transaction may start. Following each commit operation at the DBMS rather than a TM, a new LTXID is returned to the client. Thus, the client is ensured to have the LTXID in advance of any transaction in that session. In an embodiment, a DBMS may receive multiple transactional sets of commands from a client in a session. Each transactional set of commands may correspond to a local transaction on the DBMS. If the local transaction corresponding to the received set of commands is committed, the LTXID is stored in association with the local transaction as part of that commit operation in a transaction history table in the DBMS such as transaction history table 142. The LTXID may then be incremented for the next received transactional set of command in the session and returned with that commit operation to the client. The client then holds the next LTXID for a local transaction in that session. If there are local transaction(s) that have committed but the request to the DBMS for the transactions has not completed, the stored information indicates which set of commands is in an intermediate or embedded commit state. In a related embodiment, the DBMS stores such information in the transaction history table that includes an entry for each transactional set of commands of the multiple transactional sets of commands that were committed in the session. In one embodiment, the DBMS may update the in-memory information to indicate that a local transaction has started by updating the in-memory LTXID for that session. The transaction history table is updated when the local transaction commits.

Figure 2:
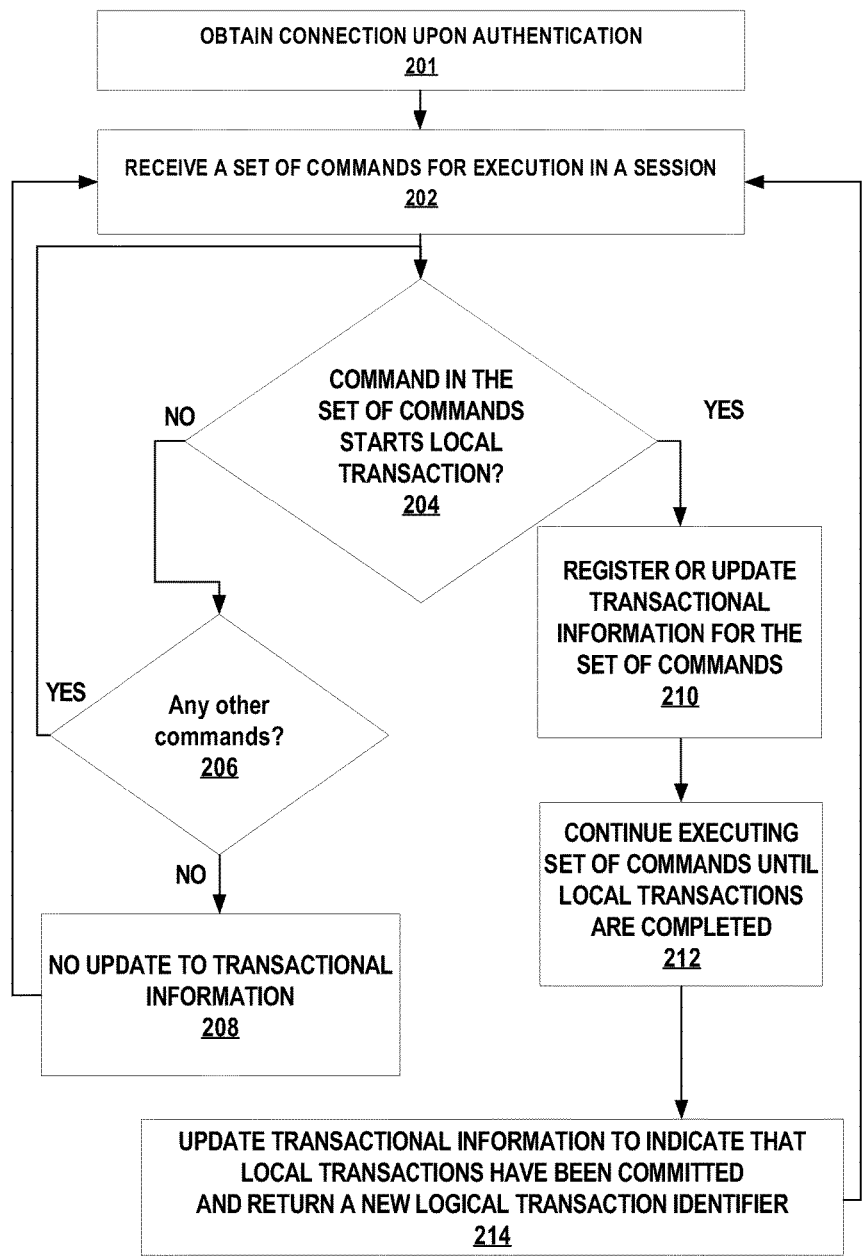
FIG. 2 is a flow diagram that depicts a process for managing execution of commands in a local transaction, in an embodiment.

FIG. 2 is a flow diagram that depicts a process for managing execution of commands in a local transaction, in an embodiment. At block 201, a DBMS client, such as a TM, requests and obtains a connection from a DBMS upon the authentication of the TM by the DBMS. The DBMS creates a local transaction handle with a valid status and returns this local transaction handle, in form of an LTXID, to the client. The LTXID enables the client to determine the commit outcome of the next transaction at this connection if a communication error occurs, in an embodiment. The client may receive subsequent handles to use when the client requests new transactions with the DBMS. The DBMS then proceeds to validate and invalidate the local transaction handle as the client issues various commands, in embodiments. The commands that cause changes to the validity of transaction handles are atomic operations and returned to client in the same round trip as the call that caused the change, in an embodiment.

At block 202, the DBMS receives a set of commands for execution in a session. For example, the DBMS may receive a request that names a sequence of one or more SQL commands to be executed by the DBMS. The DBMS determines, at block 204, whether a command in the set of commands, if executed, would start at least one local transaction. If the command would not start a local transaction, then the DBMS, at block 206, determines whether the set of commands includes any other commands. If so, then the DBMS re-performs block 204 for the second command. If the DBMS never reaches a command that starts a local transaction, then, at block 208, the DBMS completes execution of the set of commands without registering or updating transactional information, such as an LTXID, for the set of commands. In another embodiment, the DBMS stores a temporary, in-memory update to the LTXID even if there are no local transactions in the set of commands, but the temporary update is not committed unless the DBMS commits a local transaction.

On the other hand, if the DBMS determines that the next command in the set of commands, if executed, would start a local transaction, the DBMS registers, at block 210, that the LTXID is to be recorded if that local transaction committed. The DBMS continues executing the set of commands until open local transactions are committed at block 212. When committed, the LTXID is inserted into the transaction history table, if the LTXID has not been stored before. Otherwise, the entry for the existing LTXID is updated. In one embodiment, the DBMS keeps track of each committed local transaction within the set of commands using an updated LTXID at each commit. In another embodiment, the DBMS only keeps track of whether or not there is at least one committed transaction in the set of commands. Upon committing an open transaction, at block 214, the DBMS inserts or updates the LTXID to indicate that the open local transactions have been committed. After committing, the next LTXID to use is generated and is returned to the DBMS client.

In one embodiment, the DBMS client sends, for execution, a set of commands to the DBMS during each roundtrip between the client and the DBMS. Following any set of commands that includes a commit, the LTXID for the set of commands is updated to reflect completion of the local transaction(s). The updated LTXID, to use next, may be held by the DBMS on each server side session. The updated LTXID is sent to the client and may be held in the client's connection object for the session. For example, the LTXID may be sent to the client along with any results that were obtained by executing the transactional set of commands. If no local transaction in the transactional sets of commands has committed, the client has the LTXID of the previous transactional set of commands that the client sent for execution before the current transactional set of commands.

In one embodiment, any commit results in an increase in the LTXID and the return of a new LTXID to the DBMS client. If the set of commands containing the commit has both committed and completed, the LTXID, recorded (i.e., the previous LTXID) in the transaction history table, has a status or outcome that includes that the set of commands "completed." In this embodiment, each commit results in updating the last LTXID on the same session. In another embodiment, each completed transactional set of commands results in updating the last LTXID on the same session.

In one embodiment, the current LTXID for a session describes the next transaction to be committed in the session. The DBMS may calculate the previous LTXID from the current LTXID in some predictable manner, such as by incrementing the previous LTXID. The DBMS passes the DBMS client the next LTXID that the DBMS plans to use, when the DBMS sends a notification to the client that the transaction associated with the previous LTXID has committed.

In an embodiment, a DBMS client may connect to a DBMS through a new session and request information for a local transaction. The request may identify a particular local transaction, for example, by using a LTXID that was previously received by the client. The DBMS may determine whether the request identified the latest transactional set of commands received for execution in the original session, i.e. the received LTXID corresponds the highest LTXID in the transaction history table for the original session. If not, the DBMS may notify the client that the client is not synchronized with the DBMS.

In a related embodiment, the DBMS may also determine whether the particular set of command(s) corresponding to the local transaction have committed. And if any are uncommitted, the DBMS may enforce any uncommitted state by blocking the local transaction(s) identified by that LTXID from committing, thus guaranteeing the outcome of the uncommitted state. Uncommitted state includes any state, in which a local transaction would have committed in the original session, if the original session had successfully completed, but the local transaction had not committed because the original session did not complete. Enforcing uncommitted state prevents the uncommitted state from later committing once another session has treated the uncommitted state as uncommitted. Once blocked the DBMS may notify the DBMS client that the set of commands identified by that logical transaction ID has not committed (or that the identified events have not occurred). In another embodiment, the DBMS may cause execution of the particular set of commands in the second session, thereby causing the local transaction(s) or event(s) to occur for the first time in the new session after the original session has been blocked.

In the same embodiments or in various other embodiments, the DBMS may determine whether some session state change had been lost, and/or whether results for the DBMS client have been lost. If local transaction(s) have committed but there is more work to do after the commit(s), the DBMS may indicate, to the client, that the commit is in an intermediate "embedded" state. The client may use the committed status and may choose to continue or not, depending on whether a completion status was required.

After a communication error or timeout, the client, or another DBMS client such as a monitoring utility, may connect to the DBMS. Then, the client, using the LTXID from the previous connection, may test the outcome of the last local transaction. If that local transaction is not committed, the DBMS may block that LTXID, so preventing an earlier in-flight local transaction using that LTXID from committing that has been active before the replay. An attempt to block the LTXID returns committed if the LTXID has already been committed, or if the LTXID was previously blocked repeating the request for commit outcome continues to return UNCOMMITTED. The process is fully deterministic.

The table below illustrates several examples for maintaining the LTXID when processing local transactions at the DBMS.

| Structure | Example Behavior | Other Example(s) |
|---|---|---|
| Transaction control statement (TCL) statement that is purely recursive | No change to the LTXID | Recursive and also autonomous transactions are intentionally skipped as they are not part of the primary transaction |
| TCL with a top level COMMIT at end | Single increment of LTXID with outcome COMMITTED | |
| TCL with greater than one top level COMMIT, including one at end | Single increment of LTXID with outcome COMMITTED. Intermediate COMMIT have outcome EMBEDDED overridden by the last COMMIT | Multiple increment of LTXID, intermediate COMMITs have outcome EMBEDDED. Last has outcome COMMITTED |
| DDL with an open transaction beforehand | Single increment of LTXID with outcome EMBEDDED Outcome EMBEDDED overridden by the last COMMIT | Multiple increment of LTXID, intermediate COMMITs have outcome EMBEDDED. Last has outcome COMMITTED |

In another embodiment, a public interface is provided GET_LTXID_OUTCOME with one input parameter LTXID, and two parameters are returned—COMMITTED—with values TRUE or FALSE and USER_CALL_COMPLETED—with values TRUE or FALSE, plus error codes that include the errors for CLIENT AHEAD and SERVER AHEAD, when requesting the outcome of an LTXID (by calling GET_LTXID_OUTCOME). The result of the local transaction is determined to be COMMITTED=TRUE, if any command in the set of commands committed. The result of the of the local transaction is determined to be USER_CALL_COMPLETED=TRUE, if the commit was the final call and no additional results need to be returned to the DBMS client

| OUTCOME FOR AN LTXID USING GET_LTXID_OUTCOME | | |
|---|---|---|
| COMMITTED | USER_CALL_COMPLETED | Interpretation |
| TRUE | TRUE | The user call committed and ran to completion |
| TRUE | FALSE | The user call committed but may have more work to do or information to return |
| FALSE | FALSE | The user call did not commit |

A logical transaction identifier (LTXID) may include unique fields for a database of any type including container, pluggable or standalone, in order to detect if a failover is against the same or a different database, in an embodiment. A logical transaction identifier containing such fields is said to be "globally unique." In other embodiments, the logical transaction identifier may also include unique fields for the instance, session, version, and/or service. In one example, the logical transaction id is passed to and held or stored in the Oracle® Call Interface ("OCI") session handle or ODBC or ODP.Net session handle or in a connection object for the thin Java™ Database Connectivity ("JDBC") driver. The DBMS client holds a copy of the next logical transaction id that the DBMS plans to use.

In one embodiment, the LTXID includes:
Version
Database identifier
   Includes Pluggable database identifier for consolidated databases
Database instance identifier
Logical session number (GUID)
Commit number
Service identifier
Status The logical session number (GUID) is automatically assigned at session establishment. In one embodiment, the GUID is an opaque structure that may not be read by an application. In one embodiment, the GUID is unique for the life of the transaction history.

The commit number uniquely identifies a local transaction within local transactions of the same session for the same database. In one embodiment, the commit number for an LTXID is generated by incrementing the commit number of the LTXID for the previous local transaction on the same session once the previous transaction has been committed.

The status indicates whether a transactional set of commands corresponding to an LTXID is part of a global transaction and as such, is managed by a TM rather than a DBMS. In one embodiment, the status may have value VALID when the transactional set of commands are managed by the DBMS and INVALID when the transactional set of commands are part of a global transaction.

Global Transaction

A transaction manager (TM) may initiate global transactions with one or more resource managers (RMs) to service requests from clients. In an embodiment, a TM may initiate an execution of a global transaction with a RM, such as a DBMS, and may generate one or more identifiers to identify and manage the global transaction. One such identifier, a unique identifier for the global transaction is referred herein as a global transaction identifier (GTRID). The TM may manage the execution of transactional sets of commands associated with the global transaction using the GTRID of the global transaction. Each transactional set of commands executed on a RM as part of a global transaction is referred herein as a "transaction branch." Each transaction branch within the global transaction may be identified by another identifier, referred herein as a transaction branch qualifier (BQUAL). GTRID and BQUAL may be combined together to uniquely identify a transaction branch among global transactions with RMs. For simplicity, the combination of GTRID and BQUAL identifying a transaction branch is referred herein as "XID." In various embodiments, XID may contain additional information encoded in its value, such as a format identifier that indicates the type of TM that generated the XID.

In one embodiment, when a TM issues the first transaction branch of a global transaction for execution on a RM, the TM may not utilize BQUAL to identify the first transaction branch. The TM and RM may identify the first transaction branch with only the GTRID for the global transaction. In a related embodiment, a global transaction may consist of a single transaction branch for each RM involved in the global transaction. Thus, the TM may similarly identify the transaction branch with the GTRID for the global transactions.

In various embodiments, GTRID, BQUAL and XID may be generated by any of a TM, a client of the TM, a RM or a combination thereof. The generating component may communicate GTRID, BQUAL and XID to the TM and other components. For example, if a client of a TM generates a GTRID for a global transaction, then the client may communicate the GTRID to the TM, which in turn may communicate the GTRID to a RM. The TM may store and maintain any and all association between a GTRID, BQUAL and XID for a transaction branch. However, for simplicity, regardless whether a transaction branch identifier consists of a GTRID, a BQUAL, a XID or combination thereof, the transaction branch identifier is referred herein as an XID.

In an embodiment, the TM may establish a session with a RM to execute transaction branches of a global transaction. Using the TM log, the TM may extract the status of a transaction branch on the RM by an XID of the transaction branch and use the data corresponding to the XID for recovery of the global transaction. Upon the establishment of the session, the TM may signal to the RM that the session is for the global transaction. For example, in the XA protocol, the TM may issue a XAstart command that contains the XID for the transaction branch to be executed.

In an embodiment, upon a receipt of a command for a global transaction, a RM may invalidate the local transaction control. In response to a session establishment, before any command is received from a client such as a TM, the RM may generate a local transaction handle, such as LTXID described for a DBMS above. The RM may presume that any session established with a client may need a local transaction control by the RM. The RM sends the generated local transaction identifier to the TM for the TM to resolve commit outcomes for the commands that TM may send next. Although the TM manages the commands to be sent for the global transaction independently from the RM, the RM may continue to track the commands by utilizing the local transaction handle. When the RM determines that the commands received are part of the global transaction, the RM may invalidate its own local transaction control of the commands.

"Local transaction control," as used herein refers to a RM managing and controlling the commit outcome of a transactional set of commands in the event of a communication error or timeout during commit processing. When the RM exercises the local transaction control, the RM, alone, ensures the idempotence of the transactional set and is the sole source for determining the commit outcome of the transaction when a communication error or timeout occurs. "Invalidating local transaction control," refers herein, to a RM yielding a guaranteed determination of the commit outcome of the global transaction to the TM. For global transactions, the TM coordinates the decision to commit the transaction or roll the transaction back, coordinates failure recovery, and reports the commit outcome of the transaction following a communication error or timeout.

In an embodiment, as part of invalidating a local transaction control, an RM may invalidate the local transaction management handle for the local transaction control, such as LTXID, which may be stored in memory of the RM. Upon the invalidation, the RM may return the invalidated local transaction handle to a TM. In one embodiment, the local transaction handle is returned to the TM in response to the invalidating command, as part of the acknowledgment for the operation that caused the invalidation. In other embodiments, the invalidated local transaction handle may be returned asynchronous from the command that caused the invalidation. Similarly, if a TM command causes validation of the local transaction handle, in some embodiments the validated handle may be returned to the TM as part of the acknowledgement, and in other embodiments, the validated handle may be returned asynchronous to the TM command. In further embodiments, the invalidated transaction handle may be returned on the next return trip to the client, which may occur later than the invalidating command. When an invalidate local transaction handle is received by the TM, if the TM or any other client uses the invalidated local transaction handle to request a management task for the local transaction, then the RM may either ignore such request or return an error message. Instead of using the local transaction management handle to determine the commit outcome of a set of commands in a transactional set, the TM may utilize an XID that was sent to the RM as part of a transaction branch.

In an embodiment, a client of the TM may use an opaque transaction handle to obtain the outcome of the last user call from the client to the TM when that user call returns a failure to the client. In response to the client sending commands for the TM to execute on RMs, the client may receive an opaque transaction handle from the TM. The client may request information about the transaction from the TM using the received handle. The opaque handle may contain a unique identifier that the TM has associated with the transaction. Thus, the client may not have a known outcome for the last user calls submitted, and may request operations to the TM using the handle provided to the client In another embodiment, the opaque transaction handle may contain the transaction handles used by the TM for the transaction, such as an XID or LTXID. Accordingly, in other embodiments, the client may inquire about the transaction directly from the RM using the LTXID if that RM is provided.

The RM, itself, may track the execution of the commands using the XID, in an embodiment. In another embodiment, the RM continues to track the commands using the invalidated local transaction handle but maintains a mapping between the local transaction handle and the XID. In such embodiment, the mapping may be stored in a transaction history table of the RM in memory or persistent. The in-memory storage will improve the performance of accessing the mapping.

In an embodiment, a DBMS may invalidate access to the commit outcome of a local transaction with a TM by changing the status of the LTXID for the local transaction. The DBMS, upon receipt of a global transaction command, may change the status of the LTXID for the session with the TM from VALID to INVALID. The LTXID may still be returned with each response to the TM but the status within the LTXID would denote the invalidity of the local transaction control by the DBMS. Once invalidated, the TM or a client of the TM, may not use the LTXID for obtaining the commit outcome of the transaction. If the client or the TM does request the commit outcome using an invalid LTXID, the DBMS may return an error in one embodiment, or ignore the request in another embodiment.

After a TM requests a global transaction over an established session with a DBMS, the TM may request the execution of database commands at the DBMS, in an embodiment. The database commands may include any PL/SQL commands such as DML and DDL statements. Once the commands are received, the DBMS may associate the requested execution of the database commands with the XID for the transaction branch. In one embodiment, the DBMS may also continue to associate the execution of the commands with LTXIDs. In such embodiment, an LTXID for a command may have been invalidated along with the local transaction control that would have otherwise recorded that LTXID to the transaction history at commit. However, the DBMS may continue to track the execution of the command as if the command is executed with the local transaction control.

In an embodiment, to execute data modification commands of a transaction branch, a DBMS may parse the commands but not execute the commands to completion. Rather, the DBMS may schedule the commands for a completion upon a receipt of an additional command such as the prepare command, which is discussed below. In another embodiment, a DBMS may parse and execute the data modification commands in a transaction to a pre-commit stage, where the changes have been successfully applied but may be rolled back upon a request. To do so, the DBMS may record the changes to the affected data blocks in a redo log of the DBMS. The DBMS may maintain the association between the changes, the commands and the XID for the transaction in form of mappings, referred herein as "transaction mappings." In one embodiment, the transaction mappings may also include mappings between the commands, the changes caused by the commands and the LTXID for the local transaction (regardless of the validity status), as well as mappings between the XID and the LTXID. In an embodiment, these may be maintained in memory, and recorded to the transaction history table if the transaction commits.

In an embodiment, transaction mappings for committed transactions are stored in a transaction history table of a DBMS. The transaction mappings are stored for a certain period of time, and a client, such as a TM, may determine the commit outcome using techniques described herein (such as GET_LTXID_OUTCOME). After this retention period has expired, the entries may be deleted. Once deleted, the commit outcome of these transactions may not be determined from the transaction mappings. Rather an error is returned; never an uncommitted result. In an embodiment, the retention period may be configurable through commands to the DBMS.

In an embodiment, transaction mappings related to an active transaction that has not been successfully committed, are maintained in-memory in a session handle and are not persisted in a DBMS. If the session is ended abruptly, due to an error, without persisting the transaction mappings, then an attempt to obtain the transaction outcome using the LTXID will cause the DBMS to force the commit outcome of the transaction to an uncommitted state. The DBMS may respond uncommitted accordingly based on the techniques described herein. "Forcing commit outcome," as used herein, refers to either returning a committed status for a transaction, if the transaction has been committed, or if the transaction has not been committed, forcing the transaction to be in uncommitted by blocking that transaction from ever committing and returning uncommitted status. The transaction mappings related to an active transaction that has not been successfully committed, are maintained in-memory in the transaction control structure of each session at the DBMS. If the session is ended abruptly, due to an error or timeout, a request to access the commit outcome using the LTXID for the transaction may force the commit outcome to an uncommitted state, and then record this outcome to the transaction history table.

In one embodiment, the TM may suspend and resume an execution of a transaction branch on a DBMS. The TM may issue a command to suspend the transaction branch of the global transaction on the DBMS. The suspension of the transaction branch denotes that no more commands will be issued by the TM for that branch until the transaction branch is resumed. The DBMS may complete the execution of already received commands for the transaction branch and then save the transaction mappings associated with the transaction branch when that branch is committed. Since no further commands for the global transaction will be received until further notice by the TM, the DBMS may validate the LTXID for the session. The valid LTXID may be returned by the DBMS in response to the command that resulted in the validation, such as XAend. After the end or suspension of the transaction branch, if any other command is received in the session, the DBMS may exercise a new local transaction using the valid LTXID.

The TM may issue a command to resume a suspended transaction branch of a global transaction on a DBMS. Such a command may include the XID for the global transaction branch to resume, so that the DBMS may associate subsequently received transaction branch commands with the previously suspended transaction. The DBMS may then invalidate the LTXID associated with the session and continue to execute the transaction branch commands. The DBMS may return the LTXID that contains INVALID status with responses to the transaction branch commands in the session.

When a TM completes execution requests for all commands in a transaction branch, the TM ends the transaction branch with a DBMS, in an embodiment. The TM may issue a command indicating the XID for the transaction branch to end at the DBMS. For example in the XA protocol, a XAend command with the XID may be received by the DBMS to denote the end of the global transaction branch. The DBMS may mark the identified transaction branch as complete. The DBMS may then validate the local transaction control and validate the LTXID associated with the session. If any further commands are received in the session, the DMBS may return the LTXID that contains VALID status.

The DBMS may receive multiple transaction branches for execution as part of a global transaction. In one embodiment, transaction branches may be run in 2 (two) different modes: tightly coupled and loosely coupled. Tightly coupled transaction branches may be the default mode, and each branch may see the uncommitted changes of the other transaction branches. Tightly coupled XA transactions execute in strict series rather than in parallel. Accordingly, in some embodiments, if a transaction branch is not explicitly ended before a new one is started, an implicit XAend is executed to end the previous transaction branch. On the other hand loosely coupled XA transactions are independent and may not see each other's changes.

A global transaction may be started for all transaction branches including those consisting of only read-only commands. To avoid generating redo, the LTXID/XID record for the global transaction are registered at the first redo generation, in an embodiment. Until a DBMS commits as part of a local transaction, no record may be written in a transaction history table. Such recording may not occur until a transaction branch that contains a data change command that would generate a redo record. Validation and invalidation occurs in-memory for the local transaction handle (LTXID). The transaction history table is updated after the commit of the transaction. For example, use case for the XA protocol may include the following steps:

1. XAstart (1st transaction branch)
   LTXID is invalidated and returned with XAstart ack
2. SQL statements
3. XAend (1st transaction branch end, the transaction mappings are not saved)
   LTXID is validated and returned with XAend ack
4. XAstart (2nd transaction branch)
   LTXID is invalidated and returned with XAstart ack
5. SQL statements
6. Insert XAend ($2^{nd}$ transaction branch ends) and returned with XAend ack
   LTXID is validated and returned with XAstart ack Two Phase Global Transaction Change Commit A TM may commit a global transaction using a two phase commit protocol, in an embodiment. When more than one RM is used in a transaction, the TM may follow the two-phase commit protocol in order to commit the global transaction consisting of a prepare phase and a commit phase.

In the prepare phase, the TM requests each RM to guarantee that the RM may commit its branches of the transaction. The TM may provide to the RM an XID for a transaction branch to prepare. The RM may place any affected resources to be modified by the transaction in a state such that the RM can either make any changes permanent if the TM subsequently requests commit, or nullify any changes if the TM subsequently requests a rollback. For example when the RM is a DBMS, the DBMS may determine that the transaction branch executed may be committed, then the DBMS may record a prepared state in a redo log of the DBMS and reply affirmatively to the TM. Otherwise, if the RM encounters any issues in preparing the changes for the committing of the transaction branch, the RM may rollback the executed commands of the transaction branch and reply negatively to the TM. In one embodiment, the RM may unilaterally rollback the transaction branch at any point until the prepare phase completes successfully, and may return negative response to the TM request to prepare the transaction branch.

In phase two, based on responses to the prepare requests from RMs, the TM may request the RMs to commit or rollback the transaction branches. To guarantee atomicity commitment of changes, the TM may not issue any commit command, unless all the participating RMs have replied affirmatively in the prepare phase. If for any of transaction branches, a RM has returned a negative response to the prepare request, then the TM may issue a rollback request for the transaction branch of the RM. In another embodiment, the TM may request the RMs to rollback all the transaction branches of the global transaction with all the RMs.

In an embodiment, if a communication error or timeout occurs in the second commit phase at a RM, the TM continues to contact that RM until the RM affirms that the commit has been successfully executed. If a communication error or timeout occurs in the first prepare phase, the TM continues to contact that participant using a recovery command until the RM confirms whether the RM has successfully prepared the transaction branch or has rolled back the transaction branch. Excluding heuristic outcomes, the commit outcome for two phase transactions may be determined using the techniques described herein.

Figure 3:
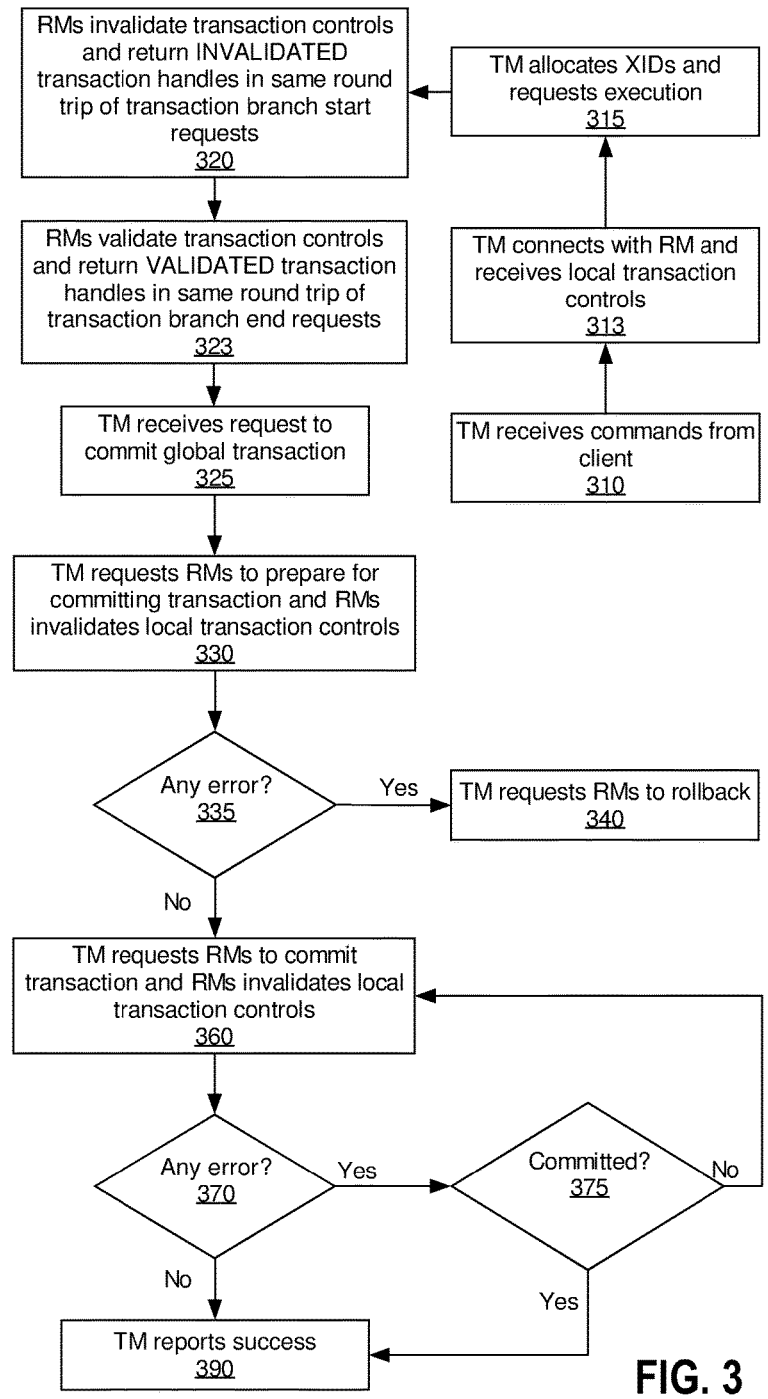
FIG. 3 is a flow diagram that depicts a process for managing a global two phase transaction, in an embodiment.

FIG. 3 is a flow diagram that depicts a process for managing a global two phase transaction, in an embodiment. At block 310, a TM receives commands to be executed on one or more RMs from a client. For example, a client, such as an airline reservation web application, may utilize a TM for idempotent committing of changes requested by a user. The web application may request the TM to update reservation table on an airline DBMS as well as process a financial transaction with a financial institution RM.

At block 313, the TM requests a connection with each RM, and, upon authentication of the request by the RM, the RM provides the TM with a respective connection along with a valid local transaction control for the connection in form of a local transaction handle such as an LTXID. At block 315, the TM allocates XIDs to initiate the execution of the client requested commands on the multiple RMs. Using the XIDs, the TM may reference the transaction branches on each of the RMs and issue commands to the RMs for execution and committal of the global transaction. In one embodiment, the TM may store the generated XIDs in association with the commands in a TM log. In other embodiments, different volatile and non-volatile memory structures may be used for storing the XIDs. Continuing with the airline reservation example, the TM may generate a global unique identifier for the global transaction, such as GTRID1. The TM may divide the transaction into three transaction branches: one branch to update the airline DBMS with passenger information, another branch for seat assignment and luggage information, and the third branch for debiting the financial institutions, denoted XID1, XID2 and XID3, respectively.

At block 320, the TM requests each RM in the global transaction to execute the transaction branches associated with the respective RM using the respective connection. Upon the receipt of the commands, the RM invalidates the respective local transaction control for the connection and may initiate the transaction for the transaction branch using the global transaction control. The RM performs the work of the transaction branch. In some embodiments, the RM may internally continue to manage the execution of the transaction branch in a local memory structure using the local transaction handle.

In an embodiment, the TM may suspend the global transaction with an RM and disconnect from the RM. Upon the receipt of the suspension command from the TM, the RM validates the local transaction control and returns the validated transaction handle with the acknowledgment of the received command. The TM may then reconnect with the RM, using a different connection and upon success, receive a new transaction control from the RM for the connection, perhaps with a different LTXID. Once the RM receives the command to resume the request for the execution of the suspended transaction branch, the RM invalidates the new local transaction control, returns the invalidated transaction handle with the acknowledgment of the received command, identifies the suspended transaction branch with the XID provided in the command, and resumes the performance of the work of the transaction branch. The TM may then continue sending commands for the transaction branch until the TM ends the transaction branch or suspends the transaction branch again.

At block 323, upon the receipt of the command to end the transaction branch from the TM, the RM validates the local transaction control for the connection and returns the validated transaction handle with the acknowledgment of the received command. The RM may perform the validation and return the local transaction control to the TM atomically with performing the ending of the transaction branch. In a related embodiment, when a DBMS is the RM, LTXID described above is invalidated for the session that receives the transaction branch start command, and re-validated, when the suspension or end of the transaction branch is received by the DBMS over the session.

Continuing with the airline reservation example, the web application may consist of four page wizard: the first page displays information about available flights for a selection, the second page allows a user to enter her information for the selected flight, the third page describes the selection of luggage options and seat assignment, and the fourth page allows user to enter payment information for the selected flight. Once the TM receives the flight selection request, the TM connects to the airline DBMS to lock the selected flight for the user. The TM establishes a session with the airline DBMS and receives a valid LTXID, LTXID for the session. The TM issues a XAstart command with XID1 over the session, and upon the receipt, the airline DBMS invalidates LTXID1 for the session and records XID1 in the transaction history table. Since LTXID is invalidated, even if the TM or the client of the TM, the airline web application, try to query or rollback the local transaction using LTXID1, the DBMS will reject the request.

After the commands are executed, the TM issues a XAend command with a suspend directive, which suspends the global transaction for the DBMS and re-validates the LTXID for the session. The TM may disconnect from the session, and if so, the session may be used by other clients. When the TM receives the passenger information related commands from the application, the TM may re-connect to the airline DBMS over a new session to issue the commands. The TM issues XAstart with XID1, which invalidates the LTXID for the new session, LTXID2. In response to the request for the execution for the data modification command to associate the passenger information with the flight information, the airline DBMS records the changes in the redo log rather than making any permanent changes to the database (changes are made permanent upon the commit of global transaction). The TM then ends XID1 transaction branch by issuing a XAend command. When the XAend command is received by the airline DBMS, the airline DBMS re-validates the LTXID for the session in use. The TM may similarly execute the XID2 transaction branch for updating luggage and seat assignment information for the user and the XID3 transaction for the financial transaction.

Continuing with FIG. 3, at block 325, the TM receives a request to commit the global transaction from the client. If the TM has been disconnected from the RMs, the TM requests a connection with each disconnected RM, and, upon authentication of the request by the RM, the RM provides the TM with the connection along with a valid local transaction control for each connection in form of a local transaction handle such as an LTXID (not depicted in FIG. 3). Otherwise, the TM is connected with an RM, then the TM holds a validated local transaction handle and may use the connection for further commands. At block 330, the TM sends prepare command to the RMs for preparing the transaction branches to be committed on the subsequent command. Upon the receipt of the TM command to prepare, the RMs invalidate local transaction controls and return the invalidated transaction handles with the acknowledgments of the received commands. The controls may be re-validated after responding to the prepare command or at a subsequent local (non-global transaction) command. Each of the RMs may than either set the transaction branches executed on that RM in a state to be definitively committed or, if error occurs, may rollback the changes as described above.

At block 335, if any RMs encounters error in the prepare phase, an error message to the TM detailing that the prepare command has been unsuccessful and the failed transaction branch commands have been rolled back. Then, at block 340, the TM may issue rollback command to all the RMs for the other transaction branches in the global transaction. The TM may then report to the client error and the global transaction state. In some embodiments, the TM may re-send the prepare using the information from the TM log. In other embodiments, the TM rolls back the all transaction branches and reports failure to the client.

Continuing with the flight reservation example, the TM sends XAprepare commands to the airline DBMS for XID1 and XID2 and to the financial institution RM for XID3. The airline DBMS may have encountered a communication error or timeout, and an error message is returned for the XAprepare command for XID1 and XID2 to the TM. The TM may retry and re-send the XAprepare commands. The communication error or timeout may have caused the airline DBMS's primary database server to failover to the standby database server. The airline DBMS, in response to receiving the prepare command verifies whether the database changes for XID1 and XID2 are in the redo log of the standby database server. If so, the airline DBMS returns successful messages to the TM. Otherwise, if the error persists, the airline DMBS may rollback any changes from XID1 and XID2 and returns an error message. If the communication error or timeout persists or an error message is returned, the TM may issue XArollback to the financial institution RM and report to the flight reservation application that the global transaction has been rolled back because of the problems with the airline DBMS. The flight reservation application may report to the user that the reservation was unsuccessful and the user has not been charged for the reservation.

After the communication error or timeout, if the airline DBMS confirms that the database changes for XID1 and XID2 have been recorded in the redo log the airline DBMS, the airline DMBS may returns success messages for the reissued XAprepare commands for XID1 and XID2, and the TM may proceed to committal of the global transaction. Upon the receipt of the TM command to prepare, the RMs invalidate the respective local transaction controls, LTXID, and return the invalidate local transaction handle with the XAprepare acknowledgement. Unless that session has terminated, the TM will use the same session for XAcommit.

Continuing with FIG. 3, if at block 335, no error has been received for preparing the transaction branches for committal, the TM requests RMs to commit the transaction branches at block 360. Upon the receipt of the TM command to commit, the RMs atomically with processing of the command, invalidate the respective local transaction controls or if the same session (as for the prepare command) is used, the local transaction handle remains invalid. The RMs return the invalidated local transaction controls to the TM in the acknowledgement response to the request.

At block 370, if any error occurs, the TM will issue an XArecover command. If in response to the XArecover command, at block 375, the RM determines that the transaction branch has not been committed, then the RM rebuilds the last state prior to commit; the TM is notified that the transaction branch has failed to commit; and the process transitions to block 360, for the TM to re-request the RM to commit the transaction branch with the XAcommit command. Otherwise, if the transaction branch has committed, the process transitions to block 390.

In response to the communication error or timeout, the TM or the client of the TM may not use the invalidated local transaction control to determine the outcome for the two-phase global transaction. The RMs have invalidated the local transaction controls at the receipt of the global transaction commands at blocks 323, 330 and 360. Even if the TM has received and passed on to the client, the invalidated transaction handles, the request that include the handles would be rejected by the RMs. Instead, the TM may rely on global transaction management commands and techniques described in FIG. 3 to determine the commit outcome of the two phase transaction.

If, at block 375, the affected RM has rebuild the last stable state (in which the transaction branch was successfully prepared), then the process transition to block 360 to re-send the commit request. Upon the successful commit of all the transaction branches, the TM reports success to the client at block 390 when the client is still connected. In other embodiments, the client may have since been disconnected. However, the client may still obtain the commit outcome using the opaque handle provided to the client by the TM. The client may be unaware that the handle contains an XID or LTXID.

Continuing with the flight reservation example, the TM requests the airline DBMS to commit XID and XID2 transaction branches by issuing XAcommit commands for each of the branch. Upon the receipt of the XAcommit commands, the airline DBMS invalidates the LTXID for the session. Thus, even if a communication error or timeout occurs, the TM may not use the LTXID received for the session for obtaining the results of the XAcommit commands at the airline DBMS.

Instead, after the connection with the airline DBMS is re-established, the TM may issue XArecover commands specifying XID and XID2. In response to the XArecover commands, the airline DBMS returns the statuses of the XID and XID2 transaction branches. If, for example, the recovery from the communication error or timeout cause the airline DBMS to roll back the XID transaction branch, the airline DBMS returns rollback status for XID1. Upon the receipt of the rollback status for XID1, the TM may rollback XID2 on the airline DBMS and XID3 on the financial institution RM using a XArollback command. The TM may then report to the flight reservation application and in turn to the user that the transaction has failed and the user has not been charged for the reservation.

Upon the successful committal of the XID1, XID2 and XID3 transaction branches, the TM may report the success of the global transaction to the web application, and the web application, in turn, may report to the user that her reservation was successful.

Single Phase Optimization

In some embodiments, a TM may not need to use a two phase protocol to commit a global transaction on an RM. A global transaction may consist of only a single transaction branch with a single RM. For example, a client may request a TM to execute commands at a single RM in a single transaction branch, or the TM may determine that the commands requested by the client for the single RM may be executed in a single transaction branch. Since such global transaction includes only a single transaction branch, the TM may not issue a prepare command to the RM for the global transaction. Instead, the TM may use local transaction controls on the RM, to manage the global transaction on the RM. In an event of a communication error or timeout, the TM may utilize the local transaction handle returned by the RM, such as LTXID, to determine the outcome of requested commands at the RM.

Figure 4:
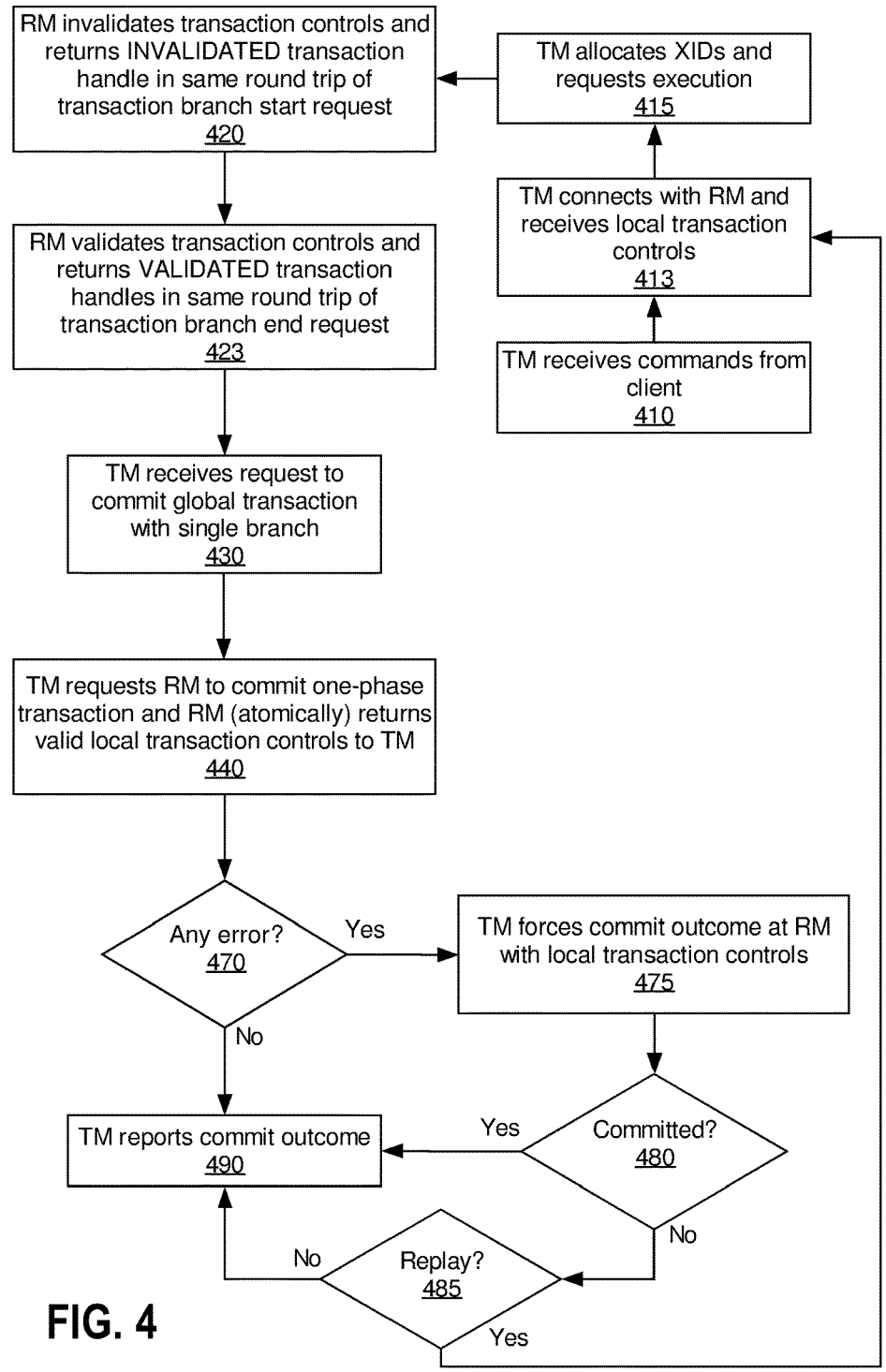
FIG. 4 is a flow diagram that depicts a process for managing a single phase transaction, in an embodiment.

FIG. 4 is a flow diagram that depicts a process for managing a single phase transaction, in an embodiment. At block 410, a TM receives commands from a client to be executed at a single RM and in response may provide the client with an opaque transaction handle. At block 413, the TM requests a connection with each RM, and, upon authentication of the request by the RM, the RM provides the TM with a respective connection along with a valid local transaction control for the connection in form of a local transaction handle such as an LTXID. At block 415, the TM allocates an XID to initiate the execution of the client requested commands on the RM and associates the XID with the opaque transaction handle. Using the XID, the TM may issue commands to the RM for execution and commitment of the global transaction. In one embodiment, the TM may store the generated XID in association with the commands in a TM log. In other embodiments, different volatile and non-volatile memory structures may be used for storing the XIDs.

At block 420, the TM establishes a session with the RM using the authenticated connection with the RM and requests the RM to execute the transaction branch. Upon the receipt of commands, the RM invalidates the respective local transaction control for the connection and may initiate the transaction for the transaction branch using the global transaction control. The RM may invalidate local transaction controls and return the invalidated local transaction handle to the TM as a part of the acknowledgment for the command to initiate the execution of the transaction branch, such as XAstart command. The RM performs the work of the transaction branch. In some embodiments, the RM may internally continue to manage the execution of the transaction branch in a local memory structure using the local transaction handle.

In an embodiment, the TM may suspend the global transaction with an RM and disconnect from the RM. Upon the receipt of the suspension command from the TM, the RM validates the local transaction control and returns the validated transaction handle with the acknowledgment of the received suspension command. The TM may then reconnect with the RM, using a different connection and upon success, receive a new transaction control from the RM for the connection, perhaps with a different LTXID. Once the RM receives the command to resume the request for the execution of the suspended transaction branch, the RM invalidates the new local transaction control, returns the invalidated transaction handle with the acknowledgment of the received command, identifies the suspended transaction branch with the XID provided in the command and resumes the performance of the work of the transaction branch. The TM may then continue sending commands for the transaction branch until the TM ends the transaction branch or suspends the transaction branch again.

At block 423, upon the receipt of the command to end the transaction branch from the TM, the RM validates the local transaction control for the connection. The RM may perform the validation atomically with performing the ending of the transaction and may atomically return the validated local transaction handle to the TM as a part of the acknowledgment for the validating command, such as XAend. In a related embodiment, when a DBMS is the RM, LTXID described above is invalidated for the session that receives the transaction branch start command, and re-validated, when the suspension or end of the transaction branch commands are received by the DBMS over the session.

As an example of a command execution that uses a single phase optimization, the airline reservation web application may request the TM to update only seat assignment for an existing reservation in the airline DBMS. The TM may generate a global unique identifier for the global transaction, such as XID1. The TM may establish a session with the airline DBMS to execute commands to update seat assignment information in the airline DBMS. Upon the session establishment, the TM receives LTXID which is generated by the airline DBMS for local transaction management of commands that are executed over the session. The TM then issues XAstart with XID1, which invalidates the LTXID for the session and issues commands to the airline DBMS to update the seat assignment. The airline DBMS executes the commands and records the resulting changes into the redo log without making any permanent changes to the database (changes are made permanent upon the commit of global transaction). The TM then ends XID1 transaction branch by issuing a XAend command, and LTXID is re-validated to be used for local transaction management of other commands that may use the same session or connection with the airline DBMS. Whenever the status of the LTXID changes, the new status may be returned on the same round trip in the response to the command that changed the status.

Continuing with FIG. 4, at block 430, the TM receives a request from the client to commit the global transaction. Unlike the two phase protocol, the TM does not issue a prepare command but rather issues a local commit command for the transaction. The prepare command, as discussed above, is used to ensure that each RM in a global transaction is ready for committal of the transaction branch. However, when a single RM is used, there is no need to coordinate amongst the RMs for transactional committal of the commands. The single RM may internally guarantee the data consistency for the single transaction branch. Thus, the TM may skip the prepare phase and issue the commit command to the single RM.

To do so, the TM may reuse the same authenticated connection with the RM as at block 413, in which case the client already holds the validated local transaction handle (or an offset of it), or the TM may request a new connection, in which case the RM will generate a new local transaction handle as part of the authentication and return to the TM valid local transaction control as an atomic part of creating the new connection (not depicted in FIG. 4). Since there is no XAprepare, the connection that is used for sending a commit command has a valid local transaction control handle, LTXID, and this LTXID may be used to determine the commit outcome. The LTXID is used to determine the commit outcome only when the commit outcome is not received by the TM, but instead an ambiguous error is received.

Using the established session that contains a valid LTXID, the TM may request the RM to commit the transaction at block 440. Upon the receipt of the commit command, the RM does not invalidate local transaction controls but rather leaves the controls and the local transaction handle valid. The RM may atomically return the valid transaction handle to the TM as part of the same operation. Thus, the TM (itself or in response to the client request using the opaque transaction handle) may request the commit outcome using the transaction handle that was already held at the TM if an error is returned instead of the commit outcome.

If at block 470, an error occurs (such as a communication error or timeout), the XID for the transaction branch may not be used for retrieving the status of the committal of the transaction branch because the commit command has been issued without the prepare command. However, any transaction processed by the RM (regardless whether initiated by a global transaction or not) is tracked at the RM by a local transaction handle (such as LTXID) using the RM's local transaction control. Therefore, the TM may use the local transaction handle received for the commit session (as long as the handle is valid) to force the commit outcome at the RM at block 475.

If, at block 470 or at block 480, the RM responds that the local transaction corresponding to the transaction branch has been committed, the TM may report success to the client at block 490. Otherwise, at block 480, in response to the TM query, after forcing the commit outcome, the RM may respond that the transaction is in uncommitted state.

In an embodiment, a TM may support an automatic replay of a failed client request. If this is a local transaction for the TM and the outcome returned from forcing the outcome is uncommitted, and the TM is configured for a replay, the TM may replay the complete request from the client that generated the original global transaction. Continuing with FIG. 4, if, in response to the force commit at block 475, the RM notifies the TM that the transaction is uncommitted, then the process transitions to block 485 to determine whether a replay should be performed by the TM. The TM determines whether the TM should execute a replay of the client's request based on whether the TM supports the replay. In a related embodiment, in addition to the support of the replay, the TM may also determine whether to replay based on the number of replays the TM has already performed for the same client request. In such embodiments, the TM may have configuration that contains a maximum number of replays that the TM should perform before TM reports to the client that the request is unsuccessful. If the maximum number of replays have been surpassed for this incident, then the TM reports the outcome to the client. If the TM determines to replay the client request, then the TM may retry the entire request at block 485. The replay may consist of process performing actions starting described in blocks starting from block 415. If the process does not proceed with the replay at block 485, the TM may report to the client that the transaction is in an uncommitted state at block 490.

Otherwise, if using a local transaction, the TM forces commit outcome and a successful commit outcome is returned and this is the last call in the request, the TM may return a successful commit status to the client at block 490.

Continuing with the airline reservation update example, the flight reservation application may request the TM to commit the update for the seat assignment in the airline DBMS. The TM uses the same session or establishes a session with the airline DBMS to execute the commit command for the transaction. When the same session, the TM already holds the LTXID. If a new session, the TM receives LTXID2, which is generated by the airline DBMS for local transaction management of commands that are executed over the session at session authentication. The TM may then issue a XAcommit command with TMONE-PHASE flag to commit the XID1 transaction. If the XAcommit command is successful, then the LTXID is incremented, and the incremented LTXID is returned to the client with the commit outcome. The LTXID status is valid on the return.

Conversely, if instead of the commit being returned successfully, a communication error or timeout occurs at the airline DBMS that forces the airline DBMS to be unresponsive to the commit command. The communication error or timeout causes the TM to receive an error in response to the XAcommit command. As the result of the communication error or timeout, the airline DBMS may or may not have committed the transaction. The TM has received an ambiguous error, not a known outcome. Once the airline DBMS comes back on-line, the TM may force the commit outcome of the transaction. The TM establishes a new session with the airline DBMS and then obtains the new LTXID from the session that was used for the commit operation. Over the newly established session, the TM issues GET_LTXID_OUTCOME with LTXID2 (the local transaction handle for the failed session). In response to the GET_LTXID_OUTCOME command, the airline DBMS forces the commit outcome for LTXID2 in the transaction history table. Based on the data in the records, the airline DBMS notifies to the TM whether XID1 transaction has been committed or not. If the XID1 transaction branch has been committed, the TM reports to the flight reservation application that the seat assignment update has been successfully executed. If not committed, the force has guaranteed that the transaction remains uncommitted. If the transaction branch is uncommitted, the TM may then report to the flight reservation application that the seat assignment update has been unsuccessful. The TM may either notify the web application that the transaction was unsuccessful. Because the uncommitted status is guaranteed by the force operation, the TM may reissue the entire request at the airline DBMS as a new global transaction branch.

Read-Only Optimizations

Another optimization of a two phase commit protocol for a global transaction is a read-only optimization. In an embodiment that uses the read-only optimization, a TM may omit the commit phase of a transaction branch with a RM, if the transaction branch is determined to consist of read-only commands (such as SELECT queries). In response to a prepare request from the TM, the RM may notify the TM that the transaction branch is read-only and thus, has been fully committed. Accordingly when a prepare command returns read-only, the TM may not issue any commit and may not need use either local or global transaction controls because no commit has been issued.

In a related embodiment, a TM may also perform one-phase commit global transaction with a single RM that has multiple transaction branches. The RM may determine that more than one transaction branches have executed commands at the RM by inspecting the transaction history table for XIDs that are associated with the same global transaction, same GTRID. When more than one transaction branches are with the RM, the RM may receive just a single commit command from the TM to commit all the branches because receiving individual commit commands for each transaction branch of the same global transaction would be redundant for the RM. To avoid a transaction entering in-doubt state, and to eliminate round trips for commit to all but the last branch and to eliminate prepare at the last branch, the RM may elect not to participate in the global transaction for all but the last transaction branch. In response to the prepare commands for each of the non-last transactions from the TM, the RM may internally execute all the commands necessary to prepare the transaction branch. The RM may then return to the TM that the transaction branch is read-only, even though the transaction branch may contain database modification commands (non read-only commands). Such response for the non-last transaction branches may allow the TM to forego the issuance of redundant commit commands for those transaction branches and only commit the last branch using a single-phase, local commit.

The TM may also determine that no other transaction branches are executed with any other RM for the global transaction: the global transaction is with a single RM. Based on this determination coupled with all but the last transaction branch being designated as read-only by the RM, the TM may determine that there is no concern for data integrity. Thus, the TM may issue prepare for all other branches, and one-phase commit for the last transaction without issuing a prepare command first at the last branch. Accordingly, similar to the single phase optimization described above, no prepare phase has been performed for the last transaction branch. Furthermore, no individual commits has been issued for the non-last transaction branches, and the non-last transaction branches may only be committed on the successful receipt of the commit command for the last transaction branch. Thus, in case of the error on the last transaction branch' commit command, the TM may be unable to ascertain the status of the transaction using global transaction controls such as the global XID. However, the TM may use the local transaction handle (LTXID) already held at the TM for the committing session to obtain a reliable outcome for the transaction using the force protocol.

Figure 5:
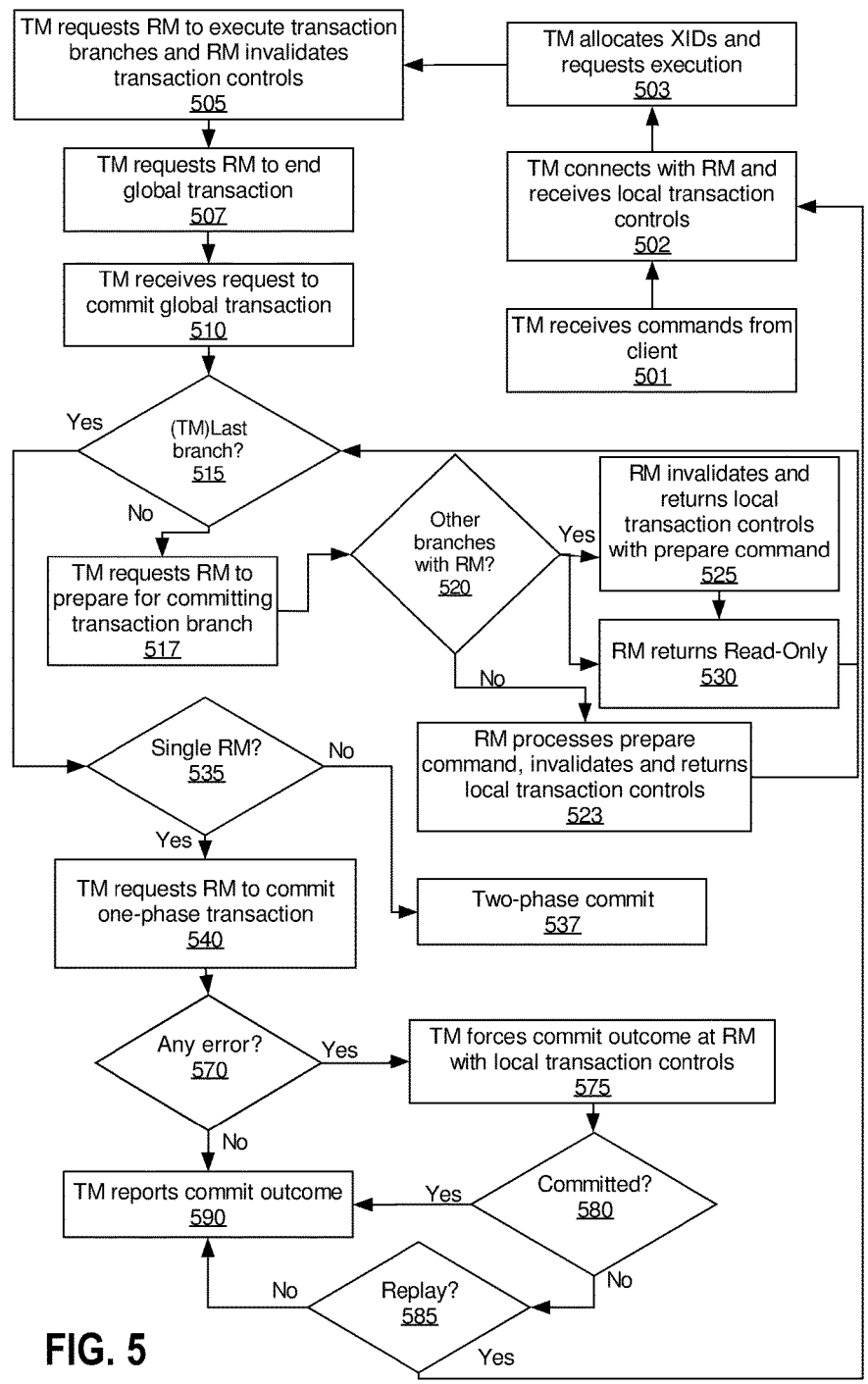
FIG. 5 is a flow diagram that depicts a process for managing read-only optimized global transaction, in an embodiment.

FIG. 5 is a flow diagram that depicts a process for managing read-only optimized global transaction, in an embodiment. At block 501, a TM receives commands from a client for a transaction branch of a global transaction to be executed at a RM. In some embodiments, upon the receipts of the commands from the client, the TM may not have the knowledge that all transaction branches are for a single RM because the client may not have yet requested the TM to execute other transaction branches in the global transaction. At block 502, the TM requests a connection with the RM, and, upon authentication of the request by the RM, the RM provides the TM with a respective connection along with a valid local transaction control for the connection in form of a local transaction handle such as an LTXID. At block 503, the TM allocates an XID for the commands of the transaction branch to initiate the execution of the client requested commands on the RM. Using the allocated XIDs, the TM may issue commands to the RM for execution and committal of the global transaction. In one embodiment, the TM may store the generated XIDs in association with the commands in a TM log. In other embodiments, different volatile and non-volatile memory structures may be used for storing the XIDs.

At block 505, the TM establishes a session with the RM using the authenticated connection with the RM and requests the RM to execute the transaction branch. Upon the receipt of commands, the RM invalidates the respective local transaction control for the connection and returns the invalidated local transaction handle to the TM as a part of the acknowledgment for the command to initiate the execution of the transaction branch, such as XAstart command. The RM may initiate the transaction for the transaction branch using the global transaction control and, in some embodiments, may track the execution of a transaction branch in a local memory structure such as a transaction history table using the XID of the transaction branch.

In an embodiment, similar to two phase global transactions, the TM may suspend the global transaction with an RM and disconnect from the RM. Upon the receipt of the suspension command from the TM, the RM validates the local transaction control and returns the validated transaction handle with the acknowledgment of the received suspension command. The TM may then reconnect with the RM, using a different connection and upon success, receive a new transaction control from the RM for the connection, perhaps with a different LTXID. Once the RM receives the command to resume the request for the execution of the suspended transaction branch, the RM invalidates the new local transaction control, returns the invalidated transaction handle with the acknowledgment of the received command and identifies the suspended transaction branch with the XID provided in the command. The TM may then continue sending commands for the transaction branch until the TM ends the transaction branch or suspends the transaction branch again.

At block 507, upon the receipt of the command to end the transaction branch from the TM, the RM validates the local transaction control for the connection. The RM may return the validated local transaction handle to the TM as a part of the acknowledgment for the validating command, such as XAend. In a related embodiment, when a DBMS is the RM, LTXID described above is invalidated for the session that receives the command to start execution of transaction branch commands, and re-validated, when the transaction branch is suspended or ended by a command from the TM to the DBMS. The blocks 501 through 507 may be repeated for multiple transaction branches of the global transaction.

At block 510, the TM receives a request from the client to commit the global transaction. The global transaction may consist of multiple transaction branches and all of the transaction branches, except perhaps the last one, need to be prepared before the committal, in an embodiment. The TM iterates through all the transaction branches one at a time until, at block 515, the TM determines that only the last transaction branch has not been prepared. For a non-last transaction branch of the global transaction, at block 517, the TM may establish a session with the RM to prepare the transaction branch. Upon the session establishment, the TM may acquires the local transaction handle for that exists on that session. The TM may then issue a prepare command for the transaction branch to a RM.

At block 520, the RM determines whether there are any other transaction branches that have been executed at the RM for the global transaction, but which still await the prepare command from the TM. Because, if there are such transaction branches of the same global transaction pending, the RM, by its read-only reply to the current transaction branch, effectively consolidates the multiple transaction branches of the global transaction into a single transaction branch for that RM. Thus, if there are other transaction branches pending for a prepare command at the RM, the process proceeds to block 525 and then to block 530, in some embodiments, or directly to block 530, in other embodiments.

At block 525, the RM invalidates the local transaction control for the session and returns the invalidated local transaction control in form of the invalid local transaction handle to the TM. Thus, the TM or client may not use the local transaction handle for the session to manage any changes associated with the RM executing the subsequent commit command. In other embodiment, when the process proceeds to block 530 after block 520, the RM may leave the local transaction control valid. In such embodiments, the RM may prevent itself from using the local transaction control to manage the global transaction.

In some embodiments, when the local transaction handle may not be used to ascertain the success of global transaction commands, if a communication error or timeout occurs before the TM receives the status of the prepare command, the TM may reissue the prepare command.

At block 530, if the transaction branch indeed contains only read-only commands, then the RM may execute the commands to completion without receiving a commit command from the TM (no commit is necessary since the commands are read-only). Otherwise, if the transaction branch includes non-read-only commands, the RM may put the changes of the transaction branch in a state that the changes may be either committed or rolled back on the last command from the TM.

At block 530, the RM returns read-only to the TM for a transaction branch with a non-read-only command in order to save the TM the need for additional communication (and thus, resources of the RM, TM and network). Since the TM does not send a commit command for read-only transaction branches, by responding with a read-only status, the RM may allow the TM to skip the commit command for all but the last transaction branch. Since the RM has determined at block 520 that there is at least another transaction branch in the same global transaction, the RM may use the commit command for the last transaction branch to commit the transaction branch. In an embodiment, the RM defers the committal of the current transaction branch to a commit command received for the last transaction branches with the RM. The commit command may create an ambiguous commit outcome if the command fails to return the status of the commit outcome at RM to the TM or returns with an error code denoting a failure.

However, in an embodiment, the transaction may not qualify for read-only optimization, if the RM determines that the current transaction branch, for which the TM has send the prepare command, is the only transaction branch at RM for the global transaction at block 520, then the process proceeds to block 523, where the prepare command is executed by the RM and the local transaction handle is invalidated and returned to the TM along with the status of the prepare command execution. The process then transitions to block 515 to process the next transaction branch. In one embodiment the current transaction branch is the only transaction branch for the global transaction at the RM, if the current transaction consists of only read-only commands, then the RM may still return read-only status to the TM. In such embodiment, the RM would execute the commands of the current transaction branch to completion and the TM may not issue a commit command for the current transaction to the RM but instead issue a command to forget the branch, such as XAforget. The process of blocks 515 through 530 may repeat for all transaction branches until, at block 515, the TM determines that the current transaction branch is the last transaction branch to prepare for the global transaction (the client of the TM has requested to commit the global transaction at block 510, and the process has reached the last transaction branch in the global transaction). If so, at block 535, the TM determines whether more than one RMs have been involved in the global transaction. If more than one RM has been involved in the global transaction, the process proceeds to block 537, and the last transaction branch is continued to be prepared and committed using the two phase commit as described in FIG. 3.

At block 535 the TM may determine that the global transaction consists of only a single RM, which has already returned to the TM to denote that all the previous transaction branches are read-only. Since all but last transaction branch for the global transaction are read-only, the TM may further determine that no issue of data integrity exists. Accordingly, the TM may issue a commit command without issuing a prepare command (one-phase commit command) for the last transaction branch, at block 540.

The TM holds the local transaction control handle (LTXID) of the session that the commit was issued against. In one embodiment, the RM may determine that the local transaction control is valid by forcing the commit outcome and received from the RM a deterministic result, committed or uncommitted, prior to commit, the TM holds an LTXID that is valid. The RM may leave the local transaction control valid based on a flag denoting a one-phase commit transaction received with the commit command from the TM so the status of the next transaction after the current transaction may be determined.

An error (such as communication error or timeout) may occur at block 570. The TM then may fail to receive the status of the commit command sent at block 540 Since only the last branch is committed, the TM or the client may use the local transaction handle that exists on the session that was used for commit to force the local transaction outcome (committed or uncommitted, if not yet committed) on this last branch at block 575.

If, at block 570 or at block 580, the RM responds that the transaction branches have been committed, the TM may report success to the client at block 590. Otherwise, at block 580, in response to the TM query, the RM may force the commit outcome so that the outcome is deterministic and then respond that the transaction branches are in an uncommitted state. If RM responds that the transaction branches are in uncommitted state, in one embodiment, the TM may return to the client that the transaction has not been committed. This is because the uncommitted state has been forced and cannot ever change from this state.

In another embodiment, a TM may be configured to automatically replay a global transaction one or more times to RMs. Accordingly, when the RM notifies the TM at block 580 that the transaction branches are in an uncommitted state by forcing the commit outcome, the TM may determine at block 585 to replay the global transaction to the RM similar to block 485. If the transaction is replayed, the process than transitions to block 505. If the process does not proceed with the replay at block 585, the TM may report to the client that the transaction is in an uncommitted state. Between each replay attempt, the commit outcome must be forced so there is no possibility that previous replay attempt resulted in an ambiguous error. Forcing the commit outcome ensures that there is exactly one commit of client requested commands, the last one, or the replays are given up and an uncommitted status is returned to the TM and client. The number of replay attempts, before an uncommitted status is returned to the client, may be pre-configured at the transaction manager.

To illustrate the read-only optimization, an example of an airline reservation web application using a TM to update an airline DBMS is provided. A user of the web application may request a first class upgrade for her existing reservation using award miles. The user transaction, thus, involves changing seat reservation as well as updating the award mile account balance with the airline DBMS. The TM may receive these two requests as separate set of commands for updating the airline DBMS: first, update to change seat reservation for an existing reservation and second, update of the table containing the award mile information.

In response to the first request by the web application, the TM then generates a global unique identifier for the global transaction, GTRID1, and allocates XID1 for the first transaction branch for updating the seat assignment. The TM then establishes a session with the airline DBMS, for which there exists an LTXID1 to manage the transactions over the session locally. Once the TM issues XAstart with XID1, the DBMS then invalidates the LTXID for the local transaction control, and returns this invalidated handle (LTXID) back to the client. Upon receipt of the commands to update of the seat information from the TM, the airline DBMS executes the commands and records the changes in a redo log rather than making any permanent changes to the database (changes are made permanent upon the commit of the local transaction). The transaction branch XID1 is then ended by the TM issuing a XAend command. Upon the receipt of the XAend command, LTXID is re-validated, and returned back to the TM in response to the XAend command. This LTXID can then be used by the airline DMBS for a local transaction control of other commands that may use the same session or connection with the DBMS.

The TM then allocates XID2 based on GTRID1, to execute commands to update award mile information as part of the second transaction branch. Similarly, upon the receipt of the transaction branch from the TM, the airline DBMS invalidates the existing local transaction handle, LTXID2, for the session with the airline DBMS and passes this back to the TM in response to the command to start the branch. The airline DBMS then executes the commands for updating the award miles without making the changes permanent. Upon the receipt of the XAend command for XID2, the airline DBMS re-validates LTXID2 and returns the validated LTXID2 to the TM in response to the command.

Upon the user request, the flight reservation application may request the TM to commit the update to the seat assignment as well as the update to the award miles account of the user in the airline DBMS. In response, the TM establishes a session with the airline DBMS to execute the prepare command for the transaction branches that are associated with the GTRID1 global transaction. Upon the establishment of the session, the TM holds the LTXID3 for that session. This LTXID was generated by the airline DBMS for local transaction management whenever that session was created. The session may be newly created or borrowed from a connection pool.

The TM may then issue XAprepare command to prepare XID1 transaction branch. When using the read-only optimization, in response to the prepare command, although, the XID1 has a non-read-only command (update to the seat assignment), the airline DBMS returns that the transaction branch is read-only (XA_RDONLY) in response to the XAprepare command for XID1. The LTXID on this database session remains in valid state, or is set to valid if it was not valid, and is returned to the client with the return of the prepare command.

Before sending XAprepare command for the next transaction branch, XID2, the TM may examine the TM log for the GTRID1 global transaction. From the log, the TM determines that the XID2 transaction branch is the last transaction branch of the GTRID1 global transaction. The TM further determines that all the transaction branches in the GTRID1 global transaction, XID1 and XID2, are with a single RM, the airline DBMS. Since the previous and only other branch has returned read-only, XA_RDONLY, the TM determines to proceed directly to committing the XID2 branch without issuing a XAprepare command to prepare the transaction branch. Accordingly, the TM establishes a session with the airline DBMS using the local transaction handle, LTXID4, already associated with that database session. The TM then issues XAcommit for the XID2 transaction branch with the TMONEPHASE flag set.

Upon the receipt of the XAcommit command from the TM, the airline DBMS proceeds to committing the changes of XID2 (the update to the miles of the user on the airline DBMS). The LTXID is incremented. This is the next LTXID5 for the next transaction on that session. The airline DBMS then responds to the XAcommit command with success and the new LTXID5 is returned with the response to the command.

If instead of returning a committed result there is a communication error or timeout, the TM may not receive the response from the airline DBMS that the XAcommit command has been successful. To determine, whether the TM may ascertain the status of the XAcommit command, the TM may check the validity status of the transaction handle for the interrupted session. Since the LTXID4 transaction handle is valid from the previously completed operations such as prepare and XAend, the TM may establish a new session with the airline DBMS to ascertain the status of the XAcommit command using the force commit. When the TM successful connects to the airline DMBS and establishes a new session, the TM issues GET_LTXID_OUTCOME with LTXID4 (the local transaction handle for the failed session) over the session. In response to the GET_LTXID_OUTCOME command, the airline DBMS forces the outcome for the LTXID4—either the transaction was committed or is forced to be uncommitted in response to the command. Forcing is critical because the commit outcome must be deterministic, uncommitted or committed. The airline DBMS returns to the TM that the transaction (XID) is committed or uncommitted. The TM may then report to the flight reservation application the outcome.

In another example, when the airline DBMS returns to the TM that the transaction is uncommitted, the TM may initiate an automatic replay of the airline reservation application requests. The TM stores the requests from the airline DBMS in association with the XIDs when the requests are received by the TM. When the original transaction fails due to an error and the recovery using techniques discussed above yields that the transaction is in an uncommitted state, the TM may retrieve the requests using the failed transaction's XIDs and then re-execute the requests in a new transaction. The TM may replay multiple times until successful or the replay number reaches a pre-configured threshold. In an embodiment, between each replay attempt, the commit outcome is forced so there is exactly a single successful replay committed, the last replay, otherwise if none of replays are successful an uncommitted result is returned to the TM, which further notifies the client.

Promotable Global Transactions

In an embodiment, a TM may initially issue commands to a RM as part of a local transaction, and then "promote" the transaction to a global transaction. Promoting local transaction refers herein to a process by which a TM converts the management of a transaction with a resource manager from being managed solely by the resource manager as a local transaction to a global transaction managed by a TM that may involve additional resource managers.

When only a single RM is involved in a transaction, the TM may use a local transaction to issue the transactional set of commands to the RM. The transaction may then be managed by the local transaction management of the RM. As long as transactional set of commands from a client are determined to be for the single RM, the TM may forego the overhead of using global transactions, and execute the transactional set of commands using local transactions as described above.

At some point, the client may request to execute additional commands as part of the same transaction but with a different, second RM. In response to the request, the TM may issue a command to promote the local transaction on the first RM to a global transaction. Upon the receipt of the request for the promotion, the first RM may invalidate the local transaction control and handle. However, the first RM may continue to track the transaction as a global transaction. The TM may initiate the control for the transaction and manage the transaction as a global transaction with multiple RMs. The TM may then to execute the client requested commands for the second RM as part of the global transaction. The TM may proceed to prepare and commit the global transaction on the first and second RMs as a two-phase protocols with optimizations described herein. After the first RM, any number of additional RMs may be involved in the promoted global transaction.

In other related embodiments, one or more optimizations described herein may apply to managing the promoted global transaction. For example, a TM may issue commands that may cause multiple transaction branches on a second RM, such that the second RM may treat transaction branches as "read-only" and the transaction branches may be managed according to the techniques described in the "Read-Only Optimization" section.

Figure 6:
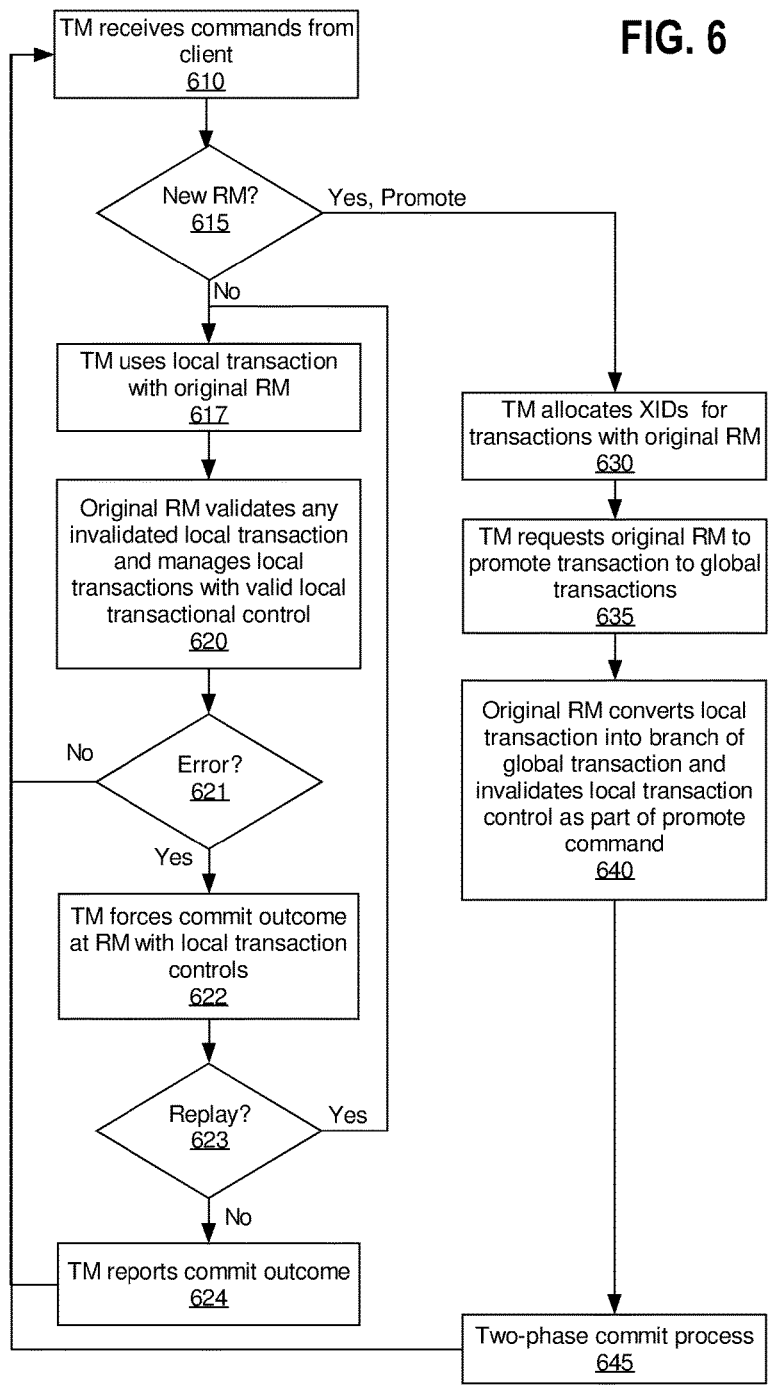
FIG. 6 is a flow diagram that depicts a process for managing a promotable transaction, in an embodiment.

FIG. 6 is a flow diagram that depicts a process for managing a promotable transaction, in an embodiment. At block 610, a TM receives one or more commands as part of a transactional set of commands to be executed by a RM. The TM, at block 615, determines whether only a single, original, RM has so far been requested to execute commands that are part of the transactional set of commands. At first, the client may be requesting the TM to execute commands from the transaction set only at the original RM. If so then, at block 617, the TM uses a local transaction with the original RM. The TM establishes a session with the original RM and uses the local transaction handle associated with that database session. When the transaction eventually commits, the TM may log the local transaction handle in the TM log along with the commit outcome. The client may access the commit outcome.

At block 620, the TM requests the execution of the received commands at the original RM using the local transaction. In one embodiment, the TM may identify whether the requested commands are committing a transaction without parsing the commands. The TM may inspect the local transaction handle (LTXID) before and after the command has been requested for an execution by the RM. If the transaction handle changes, then the requested commands committed one or more transactions. Since the original RM manages the execution of the commands using the local transaction, the local transaction handle stays valid throughout the execution. The original RM treats the TM as a generic client that connects to the RM for command executions and uses the handle to track the local transaction commit history in a transaction history table. However, if the local transaction control has been previously invalidated, the RM validates and returns to the TM a valid local transaction control handle. The local transaction management for the execution of the received commands at block 620 is described above in the "Managing Local Transaction on DBMS" section.

Local transaction management is promoted to a global transaction management when a command in a transactional set of commands uses another, new, RM for execution, in an embodiment. Thus, if at block 615, a command is received that is determined to use another new RM, then the process transitions to, then the process transitions to block 630 to promote the original local transaction. At block 630, the TM allocates XID for the new global transaction that also includes the original local transaction at the original RM. At block 635, the TM requests the original RM to promote the local transaction management to the global transaction management and use the XID to initiate the global transaction.

In an embodiment, if any error at block 621, such as a communication error or timeout in communication between the TM and the original RM, occurs before the promotion, the local transaction management may be used to force the commit status of the transaction at block 622. Using the techniques described in "Managing Local Transaction on DBMS" section, the TM may use the local transaction handle, such as LTXID, to obtain the commit outcome for the transaction after the connection with the RM is restored at block 622. Based on the received status at block 623, the TM may return the committed status to the client at block 624 or replay the client request. If a replay is performed at block 623, the process then proceeds to block 617, where a new local transaction is used to resubmit the client request commands to the original RM.

At block 640, in response to the promotion request, the original RM may convert the local transaction into a transaction branch of the global transaction with the TM.

After the promotion of the local transaction management to the global transaction, or if the local transaction on the original RM has already been promoted at blocks 630-640, the process transitions to block 645. At block 645, the promoted transaction is then managed according to techniques described for two-phase commit transactions or any applicable optimizations (referring to techniques described in the "Read-Only Optimization" section). Any additional commands received by the TM from the client at block 610 are then treated by the TM according to similar global transaction techniques described herein.

To illustrate a promotable transaction, an example of an airline reservation application with a multipage wizard for changing seat assignments is provided. Depending on the previous seat assignment of a user, the airline reservation may or may not need to charge user for the change. For instance, if a user previously booked for an economy seat but requests a seat with an extra legroom, then the user may be requested to pay extra or perhaps use her award miles. But if the user is changing seats within the same class of seats, then the seat assignment may not require other updates. For this example, the user's seat assignment and mileage account are stored on an airline DBMS, while the payment processing is performed by a financial institution resource manager.

On a first page of the wizard, the user changes her seat assignment by selecting a new seat other than already assigned seat, and submits the page. In response to submitting the page, the airline reservation requests a TM to execute the seat assignment change portion of the transaction. Since the commands received by the TM are only for the airline DBMS, the TM proceeds to establishing a session with the airline DBMS without creating a global transaction for the received set of transaction commands. The TM holds the LTXID for the established session. The TM sends the request to the airline DBMS. Upon the receipt, the airline DBMS executes the commands and records the changes in the redo log without committing the commands (without flushing the redo log). The airline DBMS records to the transaction history table only if a commit occurs. Each successful commit results in an increment in the LTXID and the incremented LTXID is returned to the TM. If a communication error or timeout occurs that disrupts the session, the TM re-establishes connection and receives a new LTXID. If the new LTXID is not equal to (and/or is an increment of) LTXID1, then the commit has been successful. Otherwise, the TM obtains the status of the local transaction using LTXID by issuing GET_LTXID_OUTCOME command with LTXID as a parameter. The command causes the airline DBMS to force the commit outcome and return to the TM whether the transaction is in a committed or uncommitted state. Conversely, if the original LTXID has changed and the TM now has another LTXID, LTXID2, then the request had issued at least one commit. If the TM determines using techniques described above, that the airline DBMS has not committed the issued commit, the TM may replay the request from the airline reservation application on the airline DBMS.

On next page of the wizard, the user may be an option of payment, if the user has selected a seat that requires an upgrade. For the payment, the user may be given a choice to pay with the user's reward miles or money or both. If the user select both methodology of payments, then the application requests the TM to update user's reward balance on the airline DBMS, as well as debit user's account at a financial institution RM as part of the same transaction of updating the seat assignment.

If the user continues the request, without using the TM, the transaction remains a local transaction (seat assignment and reward mile update) are in the same transaction not involving the TM so there is no promotion. Upon the receipt of the reward mile account update commands, the airline DBMS executes the commands and updates the redo log. Since this is the same local transaction, the airline DBMS uses the LTXID on that session LTXID1, to record the commit operation to the transaction history table. The LTXID is then incremented and returned to the client ready to use for the next transaction on that session.

If an error occurs causing a loss of the communication with the RM without receiving the outcome, upon re-establishing a session with the RM, the TM may issue GET_LTXID_OUTCOME with LTXID1, to force the commit outcome of the local transaction. The command forces the airline DBMS to return a committed or uncommitted outcome for the transaction.

If no error occurs, the airline reservation application continues with the transaction and requests the TM to request a payment transaction with a financial institution RM on behalf of the user as part of the same transaction. Since the financial institution RM is a different RM than the airline DBMS, a global transaction needs to be generated that includes the commands executed at the airline DBMS as a transaction branch of the generated global transaction. To do so, the TM generates XIDs for the global transaction: XID1 for the seat and award mile update at the airline DBMS and XID2 for the payment updated at the financial institution RM. The TM then updates the TM log records to reflect the new XIDs for the commands.

The TM then sends a command to the airline DBMS to promote the transactional set of commands associated with LTXID1 to a global transaction branch with XID1. In response, the DBMS invalidates the LTXID and returns this as part of the request for promotion.

The TM then establishes a session with the financial institution RM and issues a XAstart command with XID2 to execute commands for the user payment. After requesting execution of commands, the TM may then issue a XAend command with XID2 to close the global transaction with the financial institution RM. To prepare the XID2 branch for committing, the TM issues a XAprepare command to the financial institution RM.

Once the XAprepare commands issued for all branches return success from the financial institution RM, the TM may commit the global transaction. Each XAprepare returns an LTXID with an invalid status. The TM issues a XAcommit command with XID1 to the airline DBMS and a XAcommit command with XID2 to the financial institution RM. Upon the receipt of the XAcommit command, the airline commits the changes associated with the transaction branch (by flushing the redo log). The LTXID on this session remains invalid because this is a two-phase commit. Any request for the outcome may be handled by the TM.

Any error in communication between the TM and the airline DBMS or the financial institution RM after the promotion is handled using outcome determination techniques discussed herein for global transactions and optimizations thereof. For instance, if an error occurs before the XAcommit commands are issued by the TM, then the TM may issue XArollback both to the airline DBMS and the financial institution RM. If an error occurs after the successful XAprepare commands, then the TM may either issue XArecover or issue XArollback for non-committed changes. The TM may not use the local transaction handle after the promotion because the XAprepare and the XAcommit commands have invalidated the local transaction handle as a part of the two-phase commit protocol.

Functional Examples of Local Transaction Management State Change

In an embodiment, local transaction management control for a session with a DBMS may be validated or invalidated based on the commands issued for a global transaction on the same session as described in Table 1. LTXID, in Table 1, is a local transaction handle for a session. The columns, in Table 1, correspond to global transaction commands, which, when sent over a session, affect the local transaction control validity. The table uses XA protocol commands, however, the exact protocol or combination of protocols used for a global transaction is not critical to the techniques described herein. The rows, in Table 1, correspond to a type of global transaction management utilized over the session, such as optimizations described herein. Each cell in the table represents an embodiment when a DBMS receives a global transaction command recited for the column in a transaction of the type that is recited in the row. For each of the cells in Table 1, the validity status of the local transaction is shown. The local transaction handle in the embodiment corresponding to each of the cells, may have the status value set to the value described in the corresponding cell of Table 1.

TABLE 1

Local Transaction Control Validity

| Transaction | XAstart | XAend | XAprepare | XAcommit | XArollback | Local user call | XApromote |
|---|---|---|---|---|---|---|---|
| Single-phase optimization | INVALID | VALID | N/A | VALID and new LTXID generated | VALID | Valid if they were INVALID | Invalid |
| Read-only optimization | INVALID | VALID | INVALID | VALID and new LTXID generated | VALID | Valid if they were INVALID | Invalid |
| Two-Phase | INVALID | VALID | INVALID | INVALID | VALID | Valid if they were INVALID | Invalid |
| Promotable - after promotion | INVALID | VALID | INVALID | INVALID | VALID | Valid if they were INVALID | Invalid |

In the embodiments for the XAcommit command (see XAcommit row in Table 1), where a new LTXID is generated, the new LTXID may be generated by incrementing the LTXID. Accordingly, no performance cost of recording LTXID at each one-phase commit may be incurred because only a running number and timestamp are updated. In a related embodiment, the LTXID may be incremented by incrementing the commit number of the LTXID to generate the new LTXID.

In an embodiment, if subsequent to the global transaction commands described in the columns of Table 1, a non-transactional command is received over the same session, the previously invalidated (INVALID) local transaction handle for the session, LTXID, is validated (VALID) for the session. This allows the next transaction to reuse the database connection.

Database Management Systems

A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database. Although the embodiments of the invention are described herein using the term "SQL", the invention is not limited to just this particular database query language, and may be used in conjunction with other database query languages and constructs.

A client may issues a series of requests, such as requests for execution of queries, to a database server by establishing a database session, referred herein as "session." A session comprises a particular connection established for a client to a database server, such as a database instance, through which the client may issues the series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system may be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
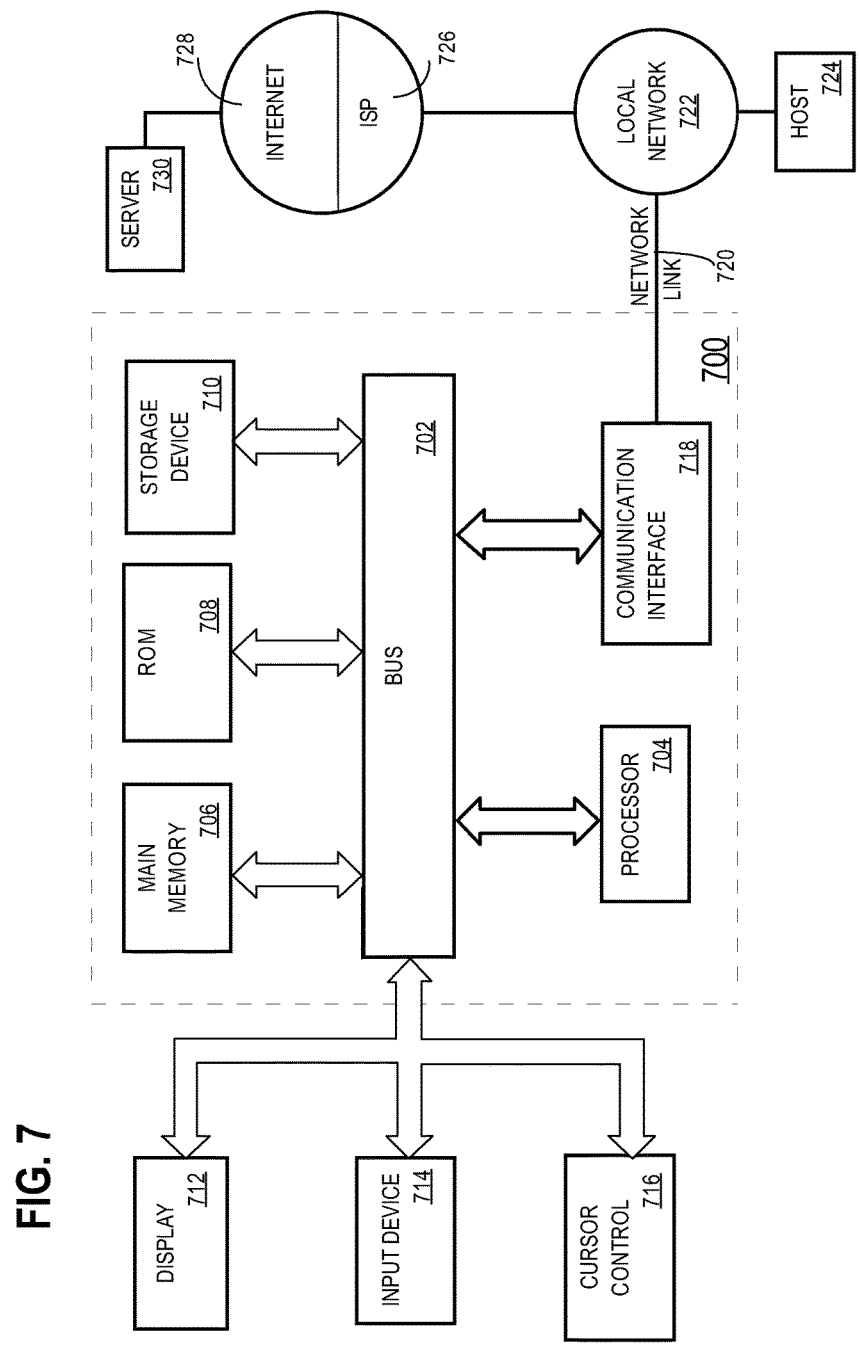
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Cloud Computing Overview

The techniques described herein are implemented using one or more processing solutions, examples of which include distributed systems, clustered computing systems, and cloud computing systems. In an embodiment, distributed transaction processing system (DTPS) 100 is part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or the whole of) the functionality attributed to DTPS 100, or to other entities within this description, is controllable via an interface that is exposed at a cloud computing system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A computer-implemented method comprising:
within one or more local transactions that are initiated with a database server for a global transaction over a plurality of database sessions with the database server:

within a particular database session, for a particular local transaction of said global transaction, receiving a request to execute a commit command for said global transaction;

receiving a request for an outcome of the commit command within a different database session;

determining whether a particular local transaction control for the particular local transaction is valid or invalid; and in response to determining that the particular local transaction control is valid, returning the outcome of the commit command of the global transaction.

2. The method of claim 1, wherein the request for the outcome of the commit command comprises a local transaction handle for the particular local transaction.

3. The method of claim 2, wherein the determining whether the particular local transaction control for the particular local transaction is valid or invalid comprises analyzing status information of the local transaction handle for the particular local transaction.

4. The method of claim 1, further comprising:
receiving a global start transaction request for a particular global transaction branch of the global transaction within the particular database session;
in response to receiving the global start transaction request, invalidating the particular local transaction control.

5. The method of claim 1, further comprising:
receiving a global end transaction request for a particular global transaction branch of the global transaction within the particular database session;
in response to receiving said global end transaction request, validating the particular local transaction control.

6. The method of claim 1, further comprising:
receiving a global prepare transaction request for a particular global transaction branch of the global transaction within the particular database session;
in response to receiving the global prepare transaction request, invalidating the particular local transaction control.

7. The method of claim 1, further comprising:
receiving a global commit transaction request for the global transaction over the particular database session with a valid local transaction control;
determining that the global commit transaction request specifies a one-phase commit optimization; and
in response to determining that the global commit transaction request specifies the one-phase commit optimization, committing the global transaction on the database server with a local transaction handle for the particular database session.

8. The method of claim 7, further comprising:
in response to determining that the global commit transaction request specifies the one-phase commit optimization, storing the local transaction handle for the particular database session on the database server in association with the valid local transaction control as a part of that commit and then incrementing and returning a new, valid local transaction handle to be used by a subsequent transaction to the database server.

9. The method of claim 7, further comprising:
prior to receiving the global commit transaction request for a particular global transaction branch of the global transaction within the particular local transaction, receiving a global prepare transaction request for a first global transaction branch of the global transaction;

determining that a command executed for the first global transaction branch is read-only;
in response to receiving the global prepare transaction request for the first global transaction branch, returning data indicating the first global transaction branch is read-only.

10. The method of claim 1, further comprising:
receiving, in a first database session, a local transaction request to execute a first commit command within a first local transaction;
in response to receiving the local transaction request, validating a first local transaction control for the first local transaction.

11. The method of claim 10, wherein validating the first local transaction control for the first local transaction is atomically performed with the first commit command.

12. The method of claim 10, further comprising:
in response to an error in the first local transaction, issuing a request for an outcome of the first commit command in a second database session different from the first database session;
determining whether the first local transaction control for the first local transaction is valid or invalid; and
in response to determining that the first local transaction control is valid, returning the outcome of the commit command of the first local transaction.

13. The method of claim 10, further comprising:
receiving a request to promote the first local transaction to the global transaction within the particular local transaction;
in response to the request to promote,
promoting the first local transaction to the global transaction, and
invalidating the particular local transaction control for the global transaction.

14. The method of claim 13, further comprising:
receiving a global prepare transaction request for the global transaction, to which the first local transaction has been promoted;
in response to receiving the global prepare transaction request, invalidating the particular local transaction control for the particular local transaction.

15. The method of claim 13, further comprising:
receiving a global commit transaction request for the global transaction to which the first local transaction has been promoted;
in response to receiving the global commit transaction request, if the particular local transaction control is valid, invalidating the particular local transaction control.

16. The method of claim 2, wherein the outcome of the commit command is stored in the database server in association with the local transaction handle as an atomic operation of the commit command for the global transaction.

17. A computer-implemented method comprising:
establishing a session with a resource manager for a global transaction with one or more resource managers that includes the resource manager;
in response to establishing the session with the resource manager, receiving from the resource manager a local transaction handle associated with a local transaction with the resource manager over the session;
issuing a commit command to commit one or more transactional sets of commands executed on the resource manager for the global transaction;
establishing a new session with the resource manager;
determining that the local transaction handle is valid;

in response to determining that the local transaction is valid, using the local transaction handle, requesting for an outcome of the commit command within the new session different from the session;

in response to requesting, receiving the commit outcome of the commit command of the global transaction.

18. The method of claim 17 wherein the resource manager is a database server and the session is a database session with the database server.

19. The method of claim 17, wherein the commit command specifies a one-phase commit optimization.

20. The method of claim 17, further comprising:

prior to establishing the session with the resource manager, establishing a first session with the resource manager for a first local transaction;

in response to establishing the first session with the resource manager, receiving from the resource manager a first local transaction handle associated with the first local transaction with the resource manager over the first session;

issuing one or more first transactional sets of commands within the first local transaction for the resource manager to execute.

21. The method of claim 20, further comprising:

issuing, in the first session, a local transaction request to execute a first commit command for the first one or more transactional sets of commands within the first local transaction;

in response to issuing the local transaction request, receiving an error for executing the first commit command within the first local transaction of the first session;

determining that the first local transaction handle is valid;

using the first local transaction handle, requesting for an outcome of the first commit command in a second session different from the first session; and in response to requesting, receiving the commit outcome of the first commit command of the first local transaction.

22. The method of claim 20, further comprising:

requesting the resource manager to promote the first local transaction to the global transaction within the local transaction over the session;

in response to requesting, receiving a response comprising a successful status and the first local transaction handle that has been invalidated for the global transaction and an acknowledgement that the request to promote has been successful, the successful status indicating that the one or more transactional sets of commands, executed on the resource manager for the global transaction, include the one or more transactional sets of commands within the first local transaction.

23. The method of claim 17, further comprising:

prior to establishing the session with the resource manager, establishing a first session with the resource manager for the global transaction;

in response to establishing the first session with the resource manager, receiving from the resource manager a first local transaction handle associated with a first local transaction with the resource manager over the first session issuing one of:
  a global start transaction request for a global transaction branch of the global transaction, or
  a global prepare transaction request for the global transaction branch of the global transaction, or
  a promotion request for the local transaction to the global transaction;

issuing a commit command within a second database session with the resource manager;

using the first local transaction handle, requesting for an outcome of the commit command within the second database session;

in response to requesting, receiving an error that the first local transaction handle has been invalidated.

24. The method of claim 23, wherein the requesting for an outcome of the commit command occurs in response to receiving an error for the commit command.

25. The method of claim 17, further comprising:

receiving from a client computing device a request for a transaction manager to execute said one or more transactional sets of commands on the resource manager;

in response to receiving from the client computing device the request, returning to the client computing device a client transaction handle;

receiving from the client computing device a request for a status, the request for the status including the client transaction handle;

based on the client transaction handle, forcing the commit outcome of the global transaction corresponding to the client transaction handle;

based on forcing the commit outcome, generating and sending to the client computing device the commit outcome.

26. The method of claim 25, wherein the commit outcome of the commit command of the global transaction is uncommitted.

27. The method of claim 17, wherein the commit outcome of the commit command of the global transaction is uncommitted, and the method further comprising, in response to receiving the commit outcome of uncommitted, automatically replaying the global transaction.

28. The method of claim 27, wherein replaying the global transaction, further comprises:

establishing a second session with the resource manager for a new global transaction with the one or more resource managers that includes the resource manager;

in response to establishing the second session with the resource manager, receiving from the resource manager a second local transaction handle associated with a second local transaction with the resource manager over the second session;

requesting the resource manager to determine the commit outcome of the first one or more transactional sets of commands using the local transaction handle for the first one or more transactional sets of commands, in response to receiving an uncommitted outcome from the resource manager, re-issuing the one or more sets of transactional commands to the resource manager using the second session; then re-issuing a command to commit the re-issued one or more sets of transactional commands executed on the resource manager for the global transaction.

29. The method of claim 27, further comprises automatically repeating the replaying until either a preconfigured number of replays has been reached or a transaction manager receives a successful commit outcome for a subsequent global transaction with said one or more transactional sets of commands.

30. The method of claim 29, further comprising:

prior to replaying, in response to receiving from a client computing device a request to execute said one or more transactional sets of commands on the resource manager, returning the client computing device a client transaction handle;
generating and sending to the client computing device a client status based on a status of the commit command received in response to the replaying.

31. One or more non-transitory computer-readable media storing a set of instructions, which, when executed by one or more hardware processors, cause:
within one or more local transactions that are initiated with a database server for a global transaction over a plurality of database sessions with the database server:
within a particular database session, for a particular local transaction of said global transaction, receiving a request to execute a commit command for said global transaction;
receiving a request for an outcome of the commit command within a different database session;
determining whether a particular local transaction control for the particular local transaction is valid or invalid; and
in response to determining that the particular local transaction control is valid, returning the outcome of the commit command of the global transaction.

32. The one or more non-transitory computer-readable media of claim 31, wherein the request for the outcome of the commit command comprises a local transaction handle for the particular local transaction.

33. The one or more non-transitory computer-readable media of claim 32, wherein the set of instructions further include instructions, which, when executed by said one or more hardware processors, cause analyzing status information of the local transaction handle for the particular local transaction.

34. The one or more non-transitory computer-readable media of claim 31, wherein the set of instructions further include instructions, which, when executed by said one or more hardware processors, cause:
receiving a global start transaction request for a particular global transaction branch of the global transaction within the particular database session;
in response to receiving the global start transaction request, invalidating the particular local transaction control.

35. The one or more non-transitory computer-readable media of claim 31, wherein the set of instructions further include instructions, which, when executed by said one or more hardware processors, cause:
receiving a global end transaction request for a particular global transaction branch of the global transaction within the particular database session;
in response to receiving said global end transaction request, validating the particular local transaction control.

36. The one or more non-transitory computer-readable media of claim 31, wherein the set of instructions further include instructions, which, when executed by said one or more hardware processors, cause:
receiving a global prepare transaction request for a particular global transaction branch of the global transaction within the particular database session;
in response to receiving the global prepare transaction request, invalidating the particular local transaction control.

37. The one or more non-transitory computer-readable media of claim 31, wherein the set of instructions further include instructions, which, when executed by said one or more hardware processors, cause:
receiving a global commit transaction request for the global transaction over the particular database session with a valid local transaction control;
determining that the global commit transaction request specifies a one-phase commit optimization; and
in response to determining that the global commit transaction request specifies the one-phase commit optimization, committing the global transaction on the database server with a local transaction handle for the particular database session.

38. The one or more non-transitory computer-readable media of claim 37, wherein the set of instructions further include instructions, which, when executed by said one or more hardware processors, cause:
in response to determining that the global commit transaction request specifies the one-phase commit optimization, storing the local transaction handle for the particular database session on the database server in association with the valid local transaction control as a part of that commit and then incrementing and returning a new, valid local transaction handle to be used by a subsequent transaction to the database server.

39. The one or more non-transitory computer-readable media of claim 37, wherein the set of instructions further include instructions, which, when executed by said one or more hardware processors, cause:
prior to receiving the global commit transaction request for a particular global transaction branch of the global transaction within the particular local transaction, receiving a global prepare transaction request for a first global transaction branch of the global transaction;
determining that a command executed for the first global transaction branch is read-only;
in response to receiving the global prepare transaction request for the first global transaction branch, returning data indicating the first global transaction branch is read-only.

40. The one or more non-transitory computer-readable media of claim 31, wherein the set of instructions further include instructions, which, when executed by said one or more hardware processors, cause:
receiving, in a first database session, a local transaction request to execute a first commit command within a first local transaction;
in response to receiving the local transaction request, validating a first local transaction control for the first local transaction.

41. The one or more non-transitory computer-readable media of claim 40, wherein validating the first local transaction control for the first local transaction is atomically performed with the first commit command.

42. The one or more non-transitory computer-readable media of claim 40, wherein the set of instructions further include instructions, which, when executed by said one or more hardware processors, cause:
in response to an error in the first local transaction, issuing a request for an outcome of the first commit command in a second database session different from the first database session;
determining whether the first local transaction control for the first local transaction is valid or invalid; and
in response to determining that the first local transaction control is valid, returning the outcome of the commit command of the first local transaction.

43. The one or more non-transitory computer-readable media of claim 40, wherein the set of instructions further include instructions, which, when executed by said one or more hardware processors, cause:
- receiving a request to promote the first local transaction to the global transaction within the particular local transaction;
- in response to the request to promote, promoting the first local transaction to the global transaction, and invalidating the particular local transaction control for the global transaction.

44. The one or more non-transitory computer-readable media of claim 43, wherein the set of instructions further include instructions, which, when executed by said one or more hardware processors, cause:
- receiving a global prepare transaction request for the global transaction, to which the first local transaction has been promoted;
- in response to receiving the global prepare transaction request, invalidating the particular local transaction control for the particular local transaction.

45. The one or more non-transitory computer-readable media of claim 43, wherein the set of instructions further include instructions, which, when executed by said one or more hardware processors, cause:
- receiving a global commit transaction request for the global transaction to which the first local transaction has been promoted;
  - in response to receiving the global commit transaction request, if the particular local transaction control is valid, invalidating the particular local transaction control.

46. The one or more non-transitory computer-readable media of claim 32, wherein the outcome of the commit command is stored in the database server in association with the local transaction handle as an atomic operation of the commit command for the global transaction.

47. One or more non-transitory computer-readable media storing a set of instructions, which, when executed by one or more hardware processors, cause:
- establishing a session with a resource manager for a global transaction with one or more resource managers that includes the resource manager;
- in response to establishing the session with the resource manager, receiving from the resource manager a local transaction handle associated with a local transaction with the resource manager over the session;
- issuing a commit command to commit one or more transactional sets of commands executed on the resource manager for the global transaction;
- establishing a new session with the resource manager;
- determining that the local transaction handle is valid;
- in response to determining that the local transaction is valid, using the local transaction handle, requesting for an outcome of the commit command within the new session different from the session;
- in response to requesting, receiving the commit outcome of the commit command of the global transaction.

48. The one or more non-transitory computer-readable media of claim 47, wherein the resource manager is a database server and the session is a database session with the database server.

49. The one or more non-transitory computer-readable media of claim 47, wherein the commit command specifies a one-phase commit optimization.

50. The one or more non-transitory computer-readable media of claim 47, wherein the set of instructions further include instructions, which, when executed by said one or more hardware processors, cause:
- prior to establishing the session with the resource manager, establishing a first session with the resource manager for a first local transaction;
- in response to establishing the first session with the resource manager, receiving from the resource manager a first local transaction handle associated with the first local transaction with the resource manager over the first session;
- issuing one or more first transactional sets of commands within the first local transaction for the resource manager to execute.

51. The one or more non-transitory computer-readable media of claim 50, wherein the set of instructions further include instructions, which, when executed by said one or more hardware processors, cause:
- issuing, in the first session, a local transaction request to execute a first commit command for the first one or more transactional sets of commands within the first local transaction;
- in response to issuing the local transaction request, receiving an error for executing the first commit command within the first local transaction of the first session;
- determining that the first local transaction handle is valid;
- using the first local transaction handle, requesting for an outcome of the first commit command in a second session different from the first session; and
- in response to requesting, receiving the commit outcome of the first commit command of the first local transaction.

52. The one or more non-transitory computer-readable media of claim 50, wherein the set of instructions further include instructions, which, when executed by said one or more hardware processors, cause:
- requesting the resource manager to promote the first local transaction to the global transaction within the local transaction over the session;
- in response to requesting, receiving a response comprising a successful status and the first local transaction handle that has been invalidated for the global transaction and an acknowledgement that the request to promote has been successful, the successful status indicating that the one or more transactional sets of commands, executed on the resource manager for the global transaction, include the one or more transactional sets of commands within the first local transaction.

53. The one or more non-transitory computer-readable media of claim 47, wherein the set of instructions further include instructions, which, when executed by said one or more hardware processors, cause:
- prior to establishing the session with the resource manager, establishing a first session with the resource manager for the global transaction;
- in response to establishing the first session with the resource manager, receiving from the resource manager a first local transaction handle associated with a first local transaction with the resource manager over the first session issuing one of:
  - a global start transaction request for a global transaction branch of the global transaction, or
  - a global prepare transaction request for the global transaction branch of the global transaction, or a promotion request for the local transaction to the global transaction; issuing a commit command within a second database session with the resource manager;

using the first local transaction handle, requesting for an outcome of the commit command within the second database session;

in response to requesting, receiving an error that the first local transaction handle has been invalidated.

54. The one or more non-transitory computer-readable media of claim 53, wherein the requesting for an outcome of the commit command occurs in response to receiving an error for the commit command.

55. The one or more non-transitory computer-readable media of claim 47, wherein the set of instructions further include instructions, which, when executed by said one or more hardware processors, cause:

receiving from a client computing device a request for a transaction manager to execute said one or more transactional sets of commands on the resource manager;

in response to receiving from the client computing device the request, returning to the client computing device a client transaction handle;

receiving from the client computing device a request for a status, the request for the status including the client transaction handle;

based on the client transaction handle, forcing the commit outcome of the global transaction corresponding to the client transaction handle;

based on forcing the commit outcome, generating and sending to the client computing device the commit outcome.

56. The one or more non-transitory computer-readable media of claim 55, wherein the commit outcome of the commit command of the global transaction is uncommitted.

57. The one or more non-transitory computer-readable media of claim 47, wherein the commit outcome of the commit command of the global transaction is uncommitted, and wherein the set of instructions further include instructions, which, when executed by said one or more hardware processors, cause, in response to receiving the commit outcome of uncommitted, automatically replaying the global transaction.

58. The one or more non-transitory computer-readable media of claim 57, wherein replaying the global transaction, and wherein the set of instructions further include instructions, which, when executed by said one or more hardware processors, cause:

establishing a second session with the resource manager for a new global transaction with the one or more resource managers that includes the resource manager;

in response to establishing the second session with the resource manager, receiving from the resource manager a second local transaction handle associated with a second local transaction with the resource manager over the second session;

requesting the resource manager to determine the commit outcome of the first one or more transactional sets of commands using the local transaction handle for the first one or more transactional sets of commands, in response to receiving an uncommitted outcome from the resource manager, re-issuing the one or more sets of transactional commands to the resource manager using the second session; then re-issuing a command to commit the re-issued one or more sets of transactional commands executed on the resource manager for the global transaction.

59. The one or more non-transitory computer-readable media of claim 57, wherein the set of instructions further include instructions, which, when executed by said one or more hardware processors, cause automatically repeating the replaying until either a preconfigured number of replays has been reached or a transaction manager receives a successful commit outcome for a subsequent global transaction with said one or more transactional sets of commands.

60. The one or more non-transitory computer-readable media of claim 59, wherein the set of instructions further include instructions, which, when executed by said one or more hardware processors, cause:

prior to replaying, in response to receiving from a client computing device a request to execute said one or more transactional sets of commands on the resource manager, returning the client computing device a client transaction handle;

generating and sending to the client computing device a client status based on a status of the commit command received in response to the replaying.

\* \* \* \* \*

UNITED STATES PATENT AND TRADEMARK OFFICE
CERTIFICATE OF CORRECTION

PATENT NO. : 10,339,127 B2
APPLICATION NO. : 15/009660
DATED : July 2, 2019
INVENTOR(S) : Colrain et al.

Page 1 of 1

It is certified that error appears in the above-identified patent and that said Letters Patent is hereby corrected as shown below:

On the Title Page

On page 3, Column 1, under Other Publications, Line 3, delete "Allowace," and insert -- Allowance, --, therefor.

In the Specification

In Column 9, Line 55, delete "of the of the" and insert -- of the --, therefor.

In Column 9, Line 57, after "client" insert -- . --.

In Column 12, Line 51, delete "client" and insert -- client. --, therefor.

In Column 19, Line 50, delete "XID" and insert -- XID1 --, therefor.

In Column 24, Line 7, delete "(non read-only" and insert -- (non-read-only --, therefor.

In Column 32, Line 2, delete "LTXID" and insert -- LTXID1 --, therefor.

In Column 32, Line 16, delete "LTXID" and insert -- LTXID1 --, therefor.

In Column 32, Line 19, delete "LTXID" and insert -- LTXID1 --, therefor.

In the Claims

In Column 41, Line 7, in Claim 18, delete "claim 17" and insert -- claim 17, --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*